(12) United States Patent
Ito et al.

(10) Patent No.: US 11,512,766 B2
(45) Date of Patent: Nov. 29, 2022

(54) VIBRATION DAMPING APPARATUS

(71) Applicant: AISIN CORPORATION, Kariya (JP)

(72) Inventors: Kazuyoshi Ito, Tsushima (JP); Yoichi Oi, Ama (JP); Takao Sakamoto, Anjo (JP); Hiroki Nagai, Nagareyama (JP); Kazuhiro Itou, Anjo (JP)

(73) Assignee: AISIN CORPORATION, Kariya (JP)

( * ) Notice: Subject to any disclaimer, the term of this patent is extended or adjusted under 35 U.S.C. 154(b) by 357 days.

(21) Appl. No.: 16/636,712

(22) PCT Filed: Sep. 28, 2018

(86) PCT No.: PCT/JP2018/036407
§ 371 (c)(1),
(2) Date: Feb. 5, 2020

(87) PCT Pub. No.: WO2019/066015
PCT Pub. Date: Apr. 4, 2019

(65) Prior Publication Data
US 2020/0240497 A1 Jul. 30, 2020

(30) Foreign Application Priority Data
Sep. 28, 2017 (JP) .............................. JP2017-189020

(51) Int. Cl.
*F16H 15/14* (2006.01)
*F16H 45/02* (2006.01)
(Continued)

(52) U.S. Cl.
CPC ........... *F16H 45/02* (2013.01); *F16F 15/145* (2013.01); *F16F 15/123* (2013.01); *F16F 15/134* (2013.01);
(Continued)

(58) Field of Classification Search
CPC ....... F16F 15/145; F16F 15/123; F16F 15/134
See application file for complete search history.

(56) References Cited

U.S. PATENT DOCUMENTS

| 2013/0283966 | A1* | 10/2013 | Baral ..................... F16F 15/145 74/574.2 |
| 2018/0298979 | A1 | 10/2018 | Tomiyama et al. |
| 2018/0372182 | A1 | 12/2018 | Takikawa et al. |

FOREIGN PATENT DOCUMENTS

| DE | 102015208736 A1 * | 12/2015 | ............ F16F 15/131 |
| DE | 102014214829 A1 * | 2/2016 | ............ F16F 15/145 |

(Continued)

OTHER PUBLICATIONS

International Search Report for PCT/JP2018/036407 dated Oct. 30, 2018 (PCT/ISA/210).

*Primary Examiner* — Thomas C Diaz
(74) *Attorney, Agent, or Firm* — Sughrue Mion, PLLC

(57) ABSTRACT

A vibration damping apparatus including a support member rotatable together with a rotational element, a restoration force generating member coupled to the support member to transmit and receive a torque with the support member, an inertial mass coupled to the support member via the restoration force generating member, a first guide surface on the restoration force generating member, a second guide surface on the inertial mass, and a coupling member having first and second rolling portions. The first and second guide surfaces are formed so that the first rolling portion rolls along the first guide surface and the second rolling portion rolls along the second guide surface along with rotation of the support member causing the restoration force generating member to swing about a rotation center of the rotational element along a radial direction of the support member and causing the inertial mass to swing about the rotation center.

10 Claims, 9 Drawing Sheets

(51) Int. Cl.
*F16F 15/14* (2006.01)
*F16F 15/123* (2006.01)
*F16F 15/134* (2006.01)

(52) U.S. Cl.
CPC ............... *F16H 2045/0205* (2013.01); *F16H 2045/0231* (2013.01); *F16H 2045/0294* (2013.01)

(56) References Cited

FOREIGN PATENT DOCUMENTS

| DE | 102014217470 A1 | * | 3/2016 | ............ F16F 15/131 |
|---|---|---|---|---|
| JP | 1-312246 A | | 12/1989 | |
| JP | 2017-040318 A | | 2/2017 | |
| WO | 2017057681 A1 | | 4/2017 | |

* cited by examiner

VIBRATION DAMPING APPARATUS

CROSS REFERENCE TO RELATED APPLICATIONS

This application is a National Stage of International Application No. PCT/JP2018/036407 filed Sep. 28, 2018, claiming priority based on Japanese Patent Application No. 2017-189020 filed Sep. 28, 2017 the contents of which are incorporated in their entirety.

TECHNICAL FIELD

The disclosure relates to a vibration damping apparatus including a restoration force generating member configured to swing along with rotation of a support member, and an inertial mass coupled to the support member via the restoration force generating member and configured to swing in conjunction with the restoration force generating member along with the rotation of the support member.

BACKGROUND ART

Hitherto, as a torque fluctuation suppressing apparatus for suppressing a torque fluctuation of a rotator to which a torque is input, there is known a torque fluctuation suppressing apparatus including a mass (restoration force generating member) arranged so as to be rotatable together with the rotator and also rotatable relative to the rotator, centrifugal elements each arranged in a radially movable manner in a recess formed in the rotator so as to receive a centrifugal force generated by rotation of the rotator and the mass, and cam mechanisms each configured to receive the centrifugal force acting on the centrifugal element and rotate the rotator and the mass (see, for example, Patent Document 1). The cam mechanism of the torque fluctuation suppressing apparatus includes a cam follower provided on the centrifugal element, and a cam (arcuate surface) formed in the inner peripheral surface of the rotator or the mass arranged on an outer peripheral side so that the cam follower abuts against the cam. When a relative displacement in a rotation direction occurs between the rotator and the mass, the cam mechanism converts the centrifugal force into a circumferential force in a direction in which the relative displacement decreases. Thus, the torque fluctuation suppressing characteristic can be changed depending on the rotation speed of the rotator by using the centrifugal force acting on the centrifugal element as a force for suppressing the torque fluctuation.

RELATED ART DOCUMENTS

Patent Documents

Patent Document 1: Japanese Unexamined Patent Application Publication No. 2017-40318 (JP 2017-40318 A)

SUMMARY OF THE DISCLOSURE

In the torque fluctuation suppressing apparatus described in Patent Document 1, the mass is movably inserted into the recess formed in the rotator. Therefore, the centrifugal force for use as the force for suppressing the torque fluctuation is attenuated by a friction force generated between the centrifugal element and the rotator (inner wall of the recess). Thus, there is a possibility that a satisfactory vibration damping effect cannot be attained. In the torque fluctuation suppressing apparatus, the radial movement of the centrifugal element is guided by the rotator. In this case, if a clearance between the recess of the rotator and the centrifugal element is large, the centrifugal element rattles in the clearance. Therefore, the friction force generated between the centrifugal element and the rotator may increase in turn. Also, when the clearance between the recess of the rotator and the centrifugal element is extremely small, the friction force generated between the recess of the rotator and the centrifugal element increases. In the torque fluctuation suppressing apparatus, no vibration damping effect can be attained if the centrifugal element cannot swing relative to the rotator by being caught on the inner wall of the recess. In the torque fluctuation suppressing apparatus, a roller arranged on the outer peripheral surface of the centrifugal element or a projection formed integrally with the centrifugal element is used as the cam follower of the cam mechanism. Therefore, behavior of the centrifugal element is unstable and the centrifugal element is tilted particularly when the centrifugal element protrudes from the recess of the rotator. Thus, there is a possibility that the friction force generated between the centrifugal element and the rotator further increases.

It is therefore an aspect of the disclosure to further improve the vibration damping performance of a vibration damping apparatus including a restoration force generating member configured to swing in a radial direction of a support member along with rotation of the support member and an inertial mass configured to swing in conjunction with the restoration force generating member.

A vibration damping apparatus disclosed herein is a vibration damping apparatus including a support member configured to rotate together with a rotational element, to which a torque is transferred from an engine, about a rotation center of the rotational element, a restoration force generating member coupled to the support member so as to transmit and receive the torque with the support member and configured to swing along with rotation of the support member, and an inertial mass coupled to the support member via the restoration force generating member and configured to swing about the rotation center in conjunction with the restoration force generating member along with the rotation of the support member. The vibration damping apparatus includes a first guide surface provided on the restoration force generating member, a second guide surface provided on the inertial mass, and a coupling member having a first rolling portion and a second rolling portion integrated together and arranged so that the first rolling portion rolls along the first guide surface and the second rolling portion rolls along the second guide surface. The first and second guide surfaces are formed so that the first rolling portion rolls along the first guide surface and the second rolling portion rolls along the second guide surface along with the rotation of the support member to cause the restoration force generating member to swing relative to the rotation center along a radial direction of the support member and cause the inertial mass to swing about the rotation center. When the support member rotates, a component force of a centrifugal force acting on the restoration force generating member is transferred from the first guide surface to the second guide surface via the coupling member.

In the vibration damping apparatus disclosed herein, when the support member rotates together with the rotational element, the first rolling portion of the coupling member rolls along the first guide surface of the restoration force generating member and the second rolling portion of the coupling member rolls along the second guide surface of the inertial mass, thereby the restoration force generating member swings along the radial direction of the support member. When the support member rotates together with the rotational element, the component force of the centrifugal force acting on the restoration force generating member is transferred to the inertial mass via the first guide surface, the coupling member, and the second guide surface. When the support member rotates together with the rotational element, the first rolling portion of the coupling member rolls along the first guide surface and the second rolling portion of the coupling member rolls along the second guide surface, thereby the inertial mass swings about the rotation center in conjunction with the restoration force generating member. Thus, a torque (inertial torque) having a phase opposite to that of a fluctuation torque transferred from the engine to the rotational element is applied to the support member via the restoration force generating member. Accordingly, the vibration of the rotational element can be damped. By coupling the restoration force generating member and the inertial mass by the coupling member that rolls along the first and second guide surfaces, friction to be caused between the restoration force generating member (first guide surface) and the coupling member (first rolling portion) and between the inertial mass (second guide surface) and the coupling member (second rolling portion) is reduced as compared to a case where the restoration force generating member is supported by the support member so as to be swingable in the radial direction. Thus, influence of the friction on the vibration damping performance can further be reduced. In addition, the degree of freedom in terms of a shape change is high in the coupling member having the first and second rolling portions. Contact between the coupling member and a surrounding member can easily be suppressed through appropriate setting of the shape of the coupling member. As a result, it is possible to further improve the vibration damping performance of the vibration damping apparatus including the restoration force generating member configured to swing in the radial direction of the support member along with the rotation of the support member and the inertial mass configured to swing in conjunction with the restoration force generating member.

DETAILED DESCRIPTION

Embodiments for carrying out various aspects of the disclosure are described with reference to the drawings.

Figure 1:
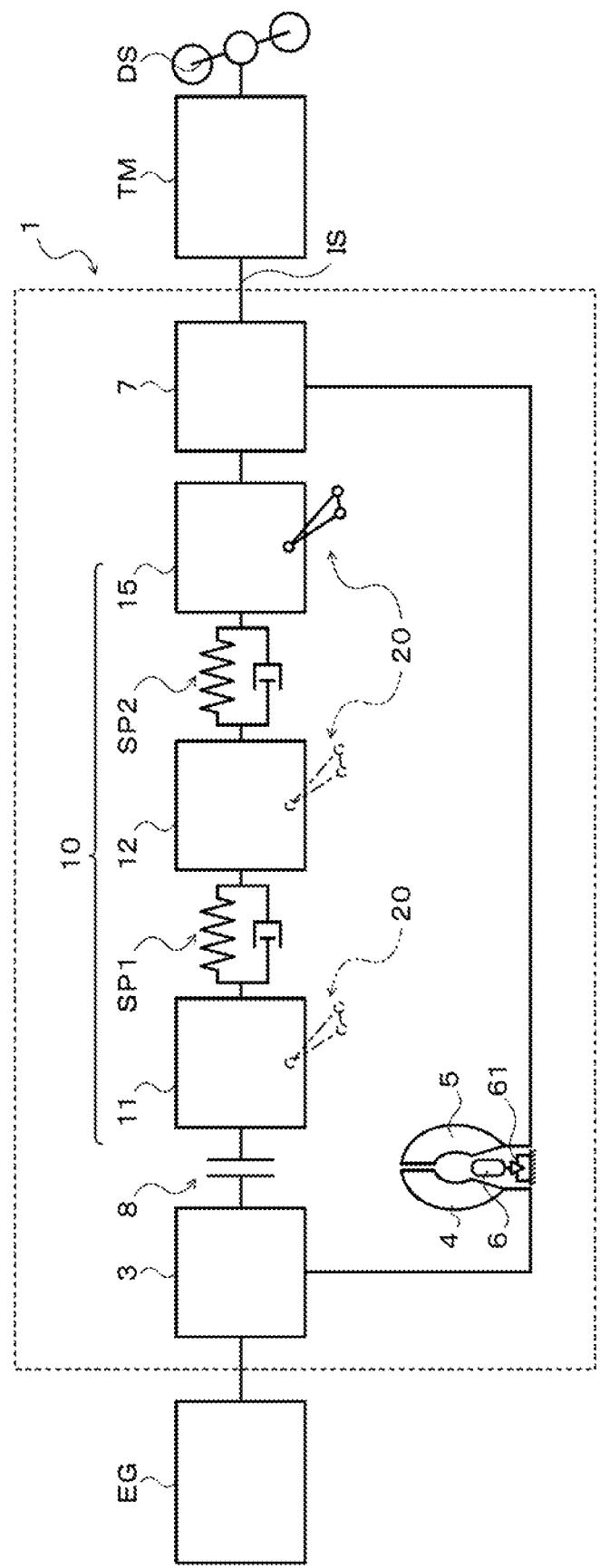
FIG. 1 is a schematic structural diagram of a starting apparatus including a vibration damping apparatus disclosed herein.

FIG. 1 is a schematic structural diagram of a starting apparatus 1 including a vibration damping apparatus 20 disclosed herein. The starting apparatus 1 illustrated in FIG. 1 is mounted on, for example, a vehicle including an engine (internal combustion engine) EG serving as a drive apparatus, and transfers power from the engine EG to drive shafts DS of the vehicle. In addition to the vibration damping apparatus 20, the starting apparatus 1 includes a front cover 3 serving as an input member coupled to a crankshaft of the engine EG a pump impeller (input-side fluid transmission element) 4 fixed to the front cover 3 and configured to rotate together with the front cover 3, a turbine runner (output-side fluid transmission element) 5 rotatable coaxially with the pump impeller 4, a damper hub 7 serving as an output member fixed to an input shaft IS of a transmission (power transfer apparatus) TM that is an automatic transmission (AT), a continuously variable transmission (CVT), a dual clutch transmission (DCT), a hybrid transmission, or a speed reducer, a lock-up clutch 8, and a damper apparatus 10.

In the following description, an "axial direction" is basically an extending direction of a central axis (axis center) of the starting apparatus 1 or the damper apparatus 10 (vibration damping apparatus 20) unless otherwise specified. A "radial direction" is basically a radial direction of the starting apparatus 1, the damper apparatus 10, or rotational elements of the damper apparatus 10 or the like, that is, an extending direction of a straight line extending from the central axis of the starting apparatus 1 or the damper apparatus 10 in a direction orthogonal to the central axis (direction of a radius) unless otherwise specified. A "circumferential direction" is basically a circumferential direction of the starting apparatus 1, the damper apparatus 10, or the rotational elements of the damper apparatus 10 or the like, that is, a direction along a rotation direction of the rotational elements unless otherwise specified.

Figure 2:
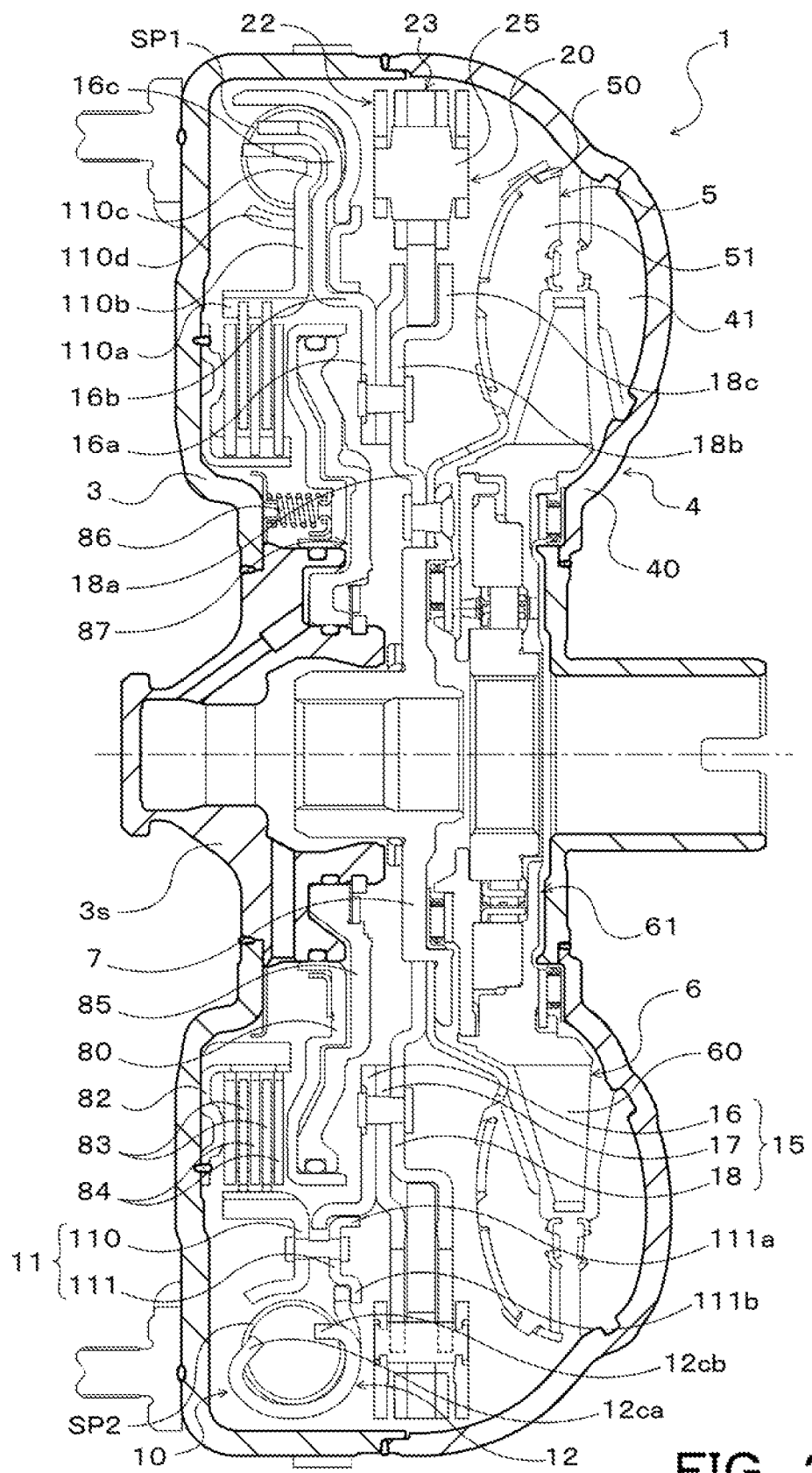
FIG. 2 is a sectional view of the starting apparatus illustrated in FIG. 1.

As illustrated in FIG. 2, the pump impeller 4 includes a pump shell 40 closely fixed to the front cover 3, and a plurality of pump blades 41 arranged on the inner surface of the pump shell 40. As illustrated in FIG. 2, the turbine runner 5 includes a turbine shell 50, and a plurality of turbine blades 51 arranged on the inner surface of the turbine shell 50. The inner peripheral portion of the turbine shell 50 is fixed to the damper hub 7 via a plurality of rivets. The pump impeller 4 and the turbine runner 5 face each other. A stator 6 configured to rectify a flow of hydraulic oil (fluid) from the turbine runner 5 to the pump impeller 4 is coaxially arranged between the pump impeller 4 and the turbine runner 5. The stator 6 includes a plurality of stator blades 60. The rotation direction of the stator 6 is set only to one direction by a one-way clutch 61. The pump impeller 4, the turbine runner 5, and the stator 6 form a torus (toric flow path) configured to circulate the hydraulic oil, and function as a torque converter (fluid transmission apparatus) having a torque amplifying function. In the starting apparatus 1, the stator 6 and the one-way clutch 61 may be omitted, and the pump impeller 4 and the turbine runner 5 may function as a fluid coupling.

The lock-up clutch 8 is structured as a multi-plate hydraulic clutch, which executes lock-up for coupling together the front cover 3 and the damper hub 7, that is, the input shaft IS of the transmission TM via the damper apparatus 10, and releases the lock-up. The lock-up clutch 8 includes a lock-up piston 80 supported by a center piece 3s fixed to the front cover 3 so as to be movable in the axial direction, a clutch drum 110 included in a driving member 11 that is an input element of the damper apparatus 10, an annular clutch hub 82 fixed to the inner surface of the front cover 3 so as to face the lock-up piston 80, a plurality of first friction engagement plates (friction plates having friction materials on both sides) 83 fitted to a spline formed on the clutch drum 110, and a plurality of second friction engagement plates (separator plates) 84 fitted to a spline formed on the outer peripheral surface of the clutch hub 82.

The lock-up clutch 8 further includes an annular flange member (oil chamber defining member) 85 attached to the center piece 3s of the front cover 3 so as to be located opposite to the front cover 3 with respect to the lock-up piston 80, that is, located closer to the turbine runner 5 with respect to the lock-up piston 80, and a plurality of return springs 86 arranged between the front cover 3 and the lock-up piston 80. As in the illustration, the lock-up piston 80 and the flange member 85 define an engagement oil chamber 87, and hydraulic oil (engagement hydraulic pressure) is supplied from an unillustrated hydraulic controller to the engagement oil chamber 87. By increasing the engagement hydraulic pressure for the engagement oil chamber 87, the lock-up piston 80 is moved in the axial direction so as to press the first and second friction engagement plates 83 and 84 toward the front cover 3. Thus, the lock-up clutch 8 can be engaged (complete engagement or slip engagement). The lock-up clutch 8 may be structured as a single-plate hydraulic clutch.

As illustrated in FIG. 1 and FIG. 2, the damper apparatus 10 includes, as rotational elements, the driving member (input element) 11 including the clutch drum 110, an intermediate member (intermediate element) 12, and a driven member (output element) 15 fixed to the damper hub 7 via a plurality of rivets together with the inner peripheral portion of the turbine shell 50. The damper apparatus 10 further includes, as torque transfer elements, a plurality of (for example, three in this embodiment) first springs (first elastic bodies) SP1 and a plurality of (for example, three in this embodiment) second springs (second elastic bodies) SP2 alternately and concyclically arranged at intervals in the circumferential direction. An arc coil spring formed of a metal material that is wound so as to have an axis center extending in an arc shape when no load is applied, or a straight coil spring formed of a metal material that is helically wound so as to have an axis center extending straight when no load is applied is employed as each of the first and second springs SP1 and SP2. A so-called dual spring may be employed as each of the first and second springs SP1 and SP2.

The driving member 11 of the damper apparatus 10 includes the clutch drum 110 described above, and an annular drive plate 111 coupled to the clutch drum 110 via a plurality of rivets so as to rotate together with the clutch drum 110. The clutch drum 110 has a tubular drum portion 110a including a spline to which the plurality of first friction engagement plates 83 are fitted, an annular coupling portion 110b extending radially outward from one end of the drum portion 110a, a plurality of (for example, three at intervals of 120° in this embodiment) spring abutment portions 110c extending radially outward from the coupling portion 110b at intervals (at regular intervals) in the circumferential direction and having claws extending in the axial direction, and a plurality of spring support portions 110d each extending from the coupling portion 110b so as to be located on a radially outer side of the drum portion 110a between adjacent spring abutment portions 110c in the circumferential direction. The drive plate 111 has a short tubular inner peripheral portion 111a, and a support portion 111b offset in the axial direction and extending radially outward from an outer peripheral portion of the drive plate 111. The drive plate 111 is fixed to the coupling portion 110b of the clutch drum 110 via a plurality of rivets so as to face the coupling portion 110b at a distance in the axial direction.

The intermediate member 12 is structured as an annular member surrounding the first and second springs SP1 and SP2 from an outer side and capable of (alternately) supporting the first and second springs SP1 and SP2 together with the plurality of spring support portions 110d of the clutch drum 110 (driving member 11) so that the first and second springs SP1 and SP2 adjoin each other concyclically. The intermediate member 12 includes a plurality of (for example, three at intervals of 120° in this embodiment) spring abutment portions 12ca extending radially inward from an outer peripheral portion at intervals in the circumferential direction, and a plurality of (for example, three at intervals of 120° in this embodiment) spring abutment portions 12cb extending in the axial direction from a side portion. As illustrated in FIG. 2, the inner peripheral portion of the intermediate member 12 is rotatably supported by the outer peripheral surface of the drive plate 111, and is supported in the axial direction by the support portion 111b.

As illustrated in FIG. 2, the driven member 15 includes an annular first driven plate 16, an annular second driven plate 17, and an annular third driven plate 18 coupled to the first and second driven plates 16 and 17 via a plurality of rivets so as to rotate together with the first and second driven plates 16 and 17 and fixed to the damper hub 7 via a plurality of rivets. As in the illustration, the second driven plate 17 is arranged closer to the front cover 3 with respect to the first driven plate 16, and the third driven plate 18 is arranged closer to the turbine runner 5 with respect to the second driven plate 17. In this embodiment, the thicknesses of the second and third driven plates 17 and 18 are set equal to each other.

The first driven plate 16 has an annular coupling portion 16a, a short cylindrical portion 16b extending in the axial direction from the outer periphery of the coupling portion 16a, and a plurality of (for example, three at intervals of 120° in this embodiment) spring abutment portions 16c extending radially outward from the end of the cylindrical portion 16b and having claws extending in the axial direction. The second driven plate 17 is an annular plate, and its outer peripheral portion is offset in the axial direction from the inner peripheral portion so as to be closer to the third driven plate 18. The third driven plate 18 includes an annular coupling portion 18a coupled to the second driven plate 17 and the damper hub 7, a short cylindrical portion 18b extending in the axial direction from the outer periphery of the coupling portion 18a so as to be spaced away from the second driven plate 17, and an annular portion 18c extending radially outward from the end of the cylindrical portion 18b and facing the second driven plate 17 at a distance in the axial direction. As illustrated in FIG. 2, the cylindrical portion 16b of the first driven plate 16 rotatably supports the drive plate 111 of the driving member 11. Thus, the driving member 11 and the intermediate member 12 supported by the drive plate 111 are aligned with the damper hub 7 by the driven member 15.

In a state in which the damper apparatus 10 is attached, the first and second springs SP1 and SP2 are supported by the spring support portions 11d of the driving member 11 and the intermediate member 12 so as to be arrayed alternately along the circumferential direction of the damper apparatus 10, and each of the first and second springs SP1 and SP2 is arranged between adjacent spring abutment portions 110c of the driving member 11 (clutch drum 110). Thus, the first and second springs SP1 and SP2 are arranged in an outer peripheral region of a fluid chamber 9 so as to be located on a radially outer side of the lock-up clutch 8 (lock-up piston 80 and first and second friction engagement plates 83 and 84).

Between the first and second springs SP1 and SP2 that are arranged between adjacent spring abutment portions 110c and paired with each other (act in series), each spring abutment portion 12ca of the intermediate member 12 abuts against the ends of the first and second springs SP1 and SP2. Between the first and second springs SP1 and SP2 that are arranged between adjacent spring abutment portions 110c and paired with each other (act in series), each spring abutment portion 12cb of the intermediate member 12 similarly abuts against the ends of the first and second springs SP1 and SP2. Thus, in the state in which the damper apparatus 10 is attached, one end of each first spring SP1 abuts against the corresponding spring abutment portion 110c of the driving member 11, and the other end of each first spring SP1 abuts against the corresponding spring abutment portions 12ca and 12cb of the intermediate member 12. In the state in which the damper apparatus 10 is attached, one end of each second spring SP2 abuts against the corresponding spring abutment portions 12ca and 12cb of the intermediate member 12, and the other end of each second spring SP2 abuts against the corresponding spring abutment portion 110c of the driving member 11.

Each spring abutment portion 16c of the driven member 15 (first driven plate 16) is interposed between the clutch drum 110 (spring abutment portion 110c) and the drive plate 111. In the state in which the damper apparatus 10 is attached, between the first and second springs SP1 and SP2 that are not paired with each other (do not act in series), each spring abutment portion 16c abuts against the ends of the first and second springs SP1 and SP2 similarly to the spring abutment portion 110c of the driving member 11. Thus, in the state in which the damper apparatus 10 is attached, the one end of each first spring SP1 also abuts against the corresponding spring abutment portion 16c of the driven member 15, and the other end of each second spring SP2 also abuts against the corresponding spring abutment portion 16c of the driven member 15. As a result, the driven member 15 is coupled to the driving member 11 via the plurality of first springs SP1, the intermediate member 12, and the plurality of second springs SP2, and the paired first and second springs SP1 and SP2 are coupled in series via the spring abutment portions 12ca and 12cb of the intermediate member 12 between the driving member 11 and the driven member 15. In this embodiment, the distance between the axis center of the starting apparatus 1 or the damper apparatus 10 and the axis center of each first spring SP1 is equal to the distance between the axis center of the starting apparatus 1 or the like and the axis center of each second spring SP2.

The damper apparatus 10 of this embodiment includes a first stopper configured to restrict a relative rotation between the driving member 11 and the intermediate member 12 and a deflection of the first springs SP1, and a second stopper configured to restrict a relative rotation between the driving member 11 and the driven member 15 (neither of which is illustrated). The first stopper is structured to restrict the relative rotation between the driving member 11 and the intermediate member 12 in a phase in which a torque transferred from the engine EG to the driving member 11 reaches a predetermined torque (first threshold) T1 smaller than a torque T2 (second threshold) corresponding to a maximum torsion angle of the damper apparatus 10. The second stopper is structured to restrict the relative rotation between the driving member 11 and the driven member 15 in a phase in which the torque transferred to the driving member 11 reaches the torque T2 corresponding to the maximum torsion angle. Thus, the damper apparatus 10 has a two-phase (two-stage) damping characteristic. The first stopper may be structured to restrict a relative rotation between the intermediate member 12 and the driven member 15 and a deflection of the second springs SP2. The damper apparatus 10 may be provided with a stopper configured to restrict the relative rotation between the driving member 11 and the intermediate member 12 and the deflection of the first springs SP1, and a stopper configured to restrict the relative rotation between the intermediate member 12 and the driven member 15 and the deflection of the second springs SP2.

The vibration damping apparatus 20 is coupled to the driven member 15 of the damper apparatus 10, and is arranged in the fluid chamber 9 filled with hydraulic oil. As illustrated in FIG. 2 to FIG. 5, the vibration damping apparatus 20 includes the second and third driven plates 17 and 18 serving as support members (support plates), a plurality of (for example, three in this embodiment) weight bodies 22 serving as restoration force generating members coupled to the second and third driven plates 17 and 18 so as to transmit and receive a torque with the second and third driven plates 17 and 18, one annular inertial mass 23 coupled to the weight bodies 22, and a plurality of (for example, six in this embodiment) coupling members 25.

Figure 3:
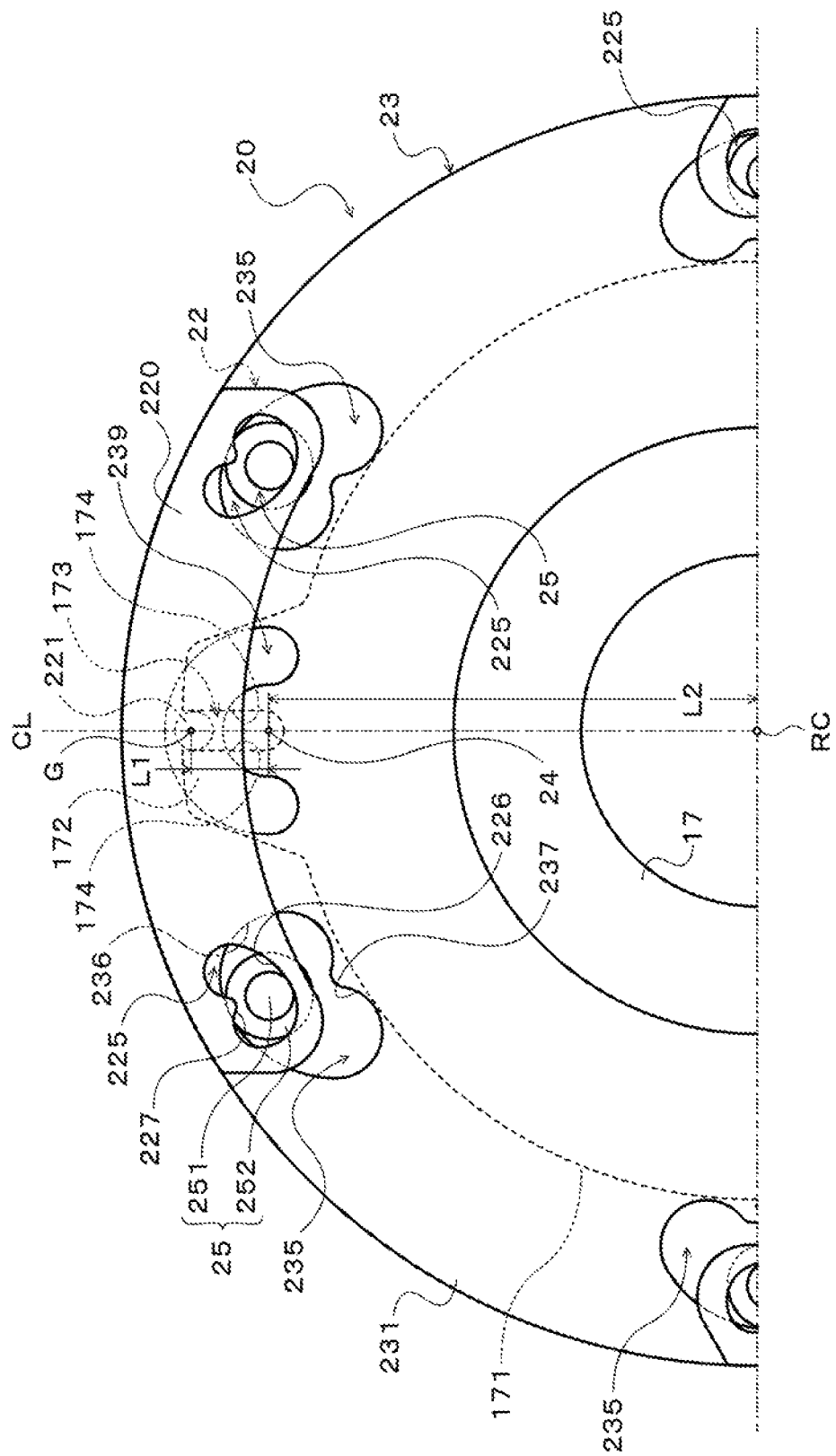
FIG. 3 is an enlarged view illustrating the vibration damping apparatus disclosed herein.
Figure 4:
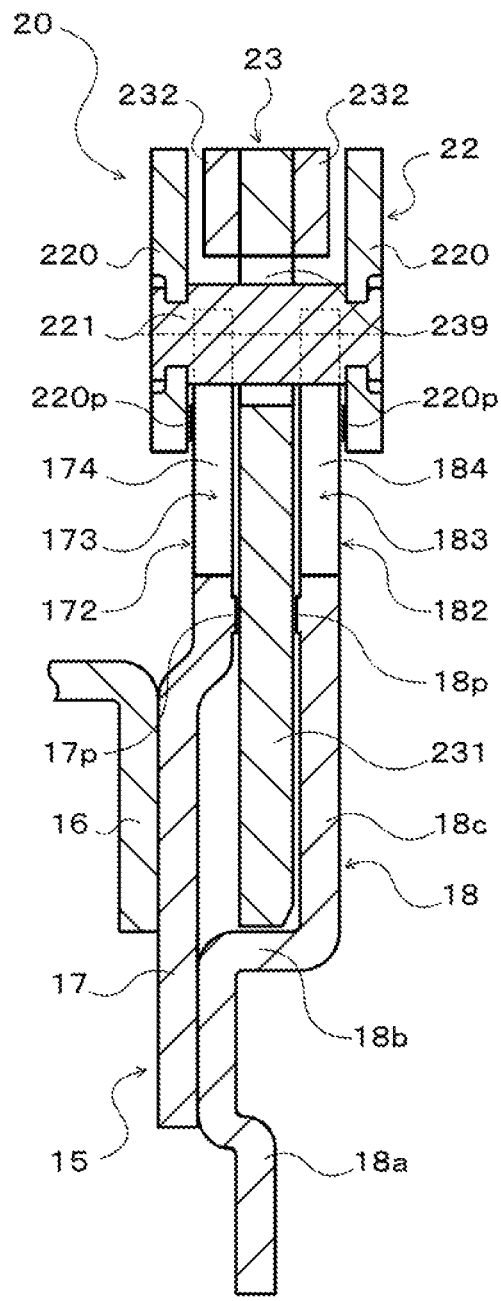
FIG. 4 is an enlarged sectional view illustrating the vibration damping apparatus disclosed herein.

As illustrated in FIG. 3 and FIG. 4, the second driven plate 17 has a plurality of (for example, three in this embodiment) protrusions 172 formed so as to protrude radially outward from its outer peripheral surface 171 at intervals (at regular intervals) in the circumferential direction. Each protrusion 172 has one slit (opening) 173 extending in the radial direction of the second driven plate 17. Each slit 173 has a pair of flat inner surfaces 174 extending in the radial direction of the second driven plate 17 and facing each other at a distance in the circumferential direction of the second driven plate 17. The pair of inner surfaces 174 function as torque transfer surfaces configured to transmit and receive a torque with the weight body 22. In this embodiment, the slit 173 is formed so that its radially outer end is open as illustrated in FIG. 3. The slit 173 may be formed so that its radially outer end is not open.

As illustrated in FIG. 4, the third driven plate 18 has a plurality of (for example, three in this embodiment) protrusions 182 formed so as to protrude radially outward from its outer peripheral surface at intervals (at regular intervals) in the circumferential direction. Each protrusion 182 has one slit (opening) 183 extending in the radial direction of the third driven plate 18. Each slit 183 has a pair of flat inner surfaces 184 extending in the radial direction of the third driven plate 18 and facing each other at a distance in the circumferential direction of the third driven plate 18. The pair of inner surfaces 184 also function as the torque transfer surfaces configured to transmit and receive a torque with the weight body 22. In this embodiment, the slit 183 is also formed so that its radially outer end is open. The slit 183 may be formed so that its radially outer end is not open.

Figure 5:
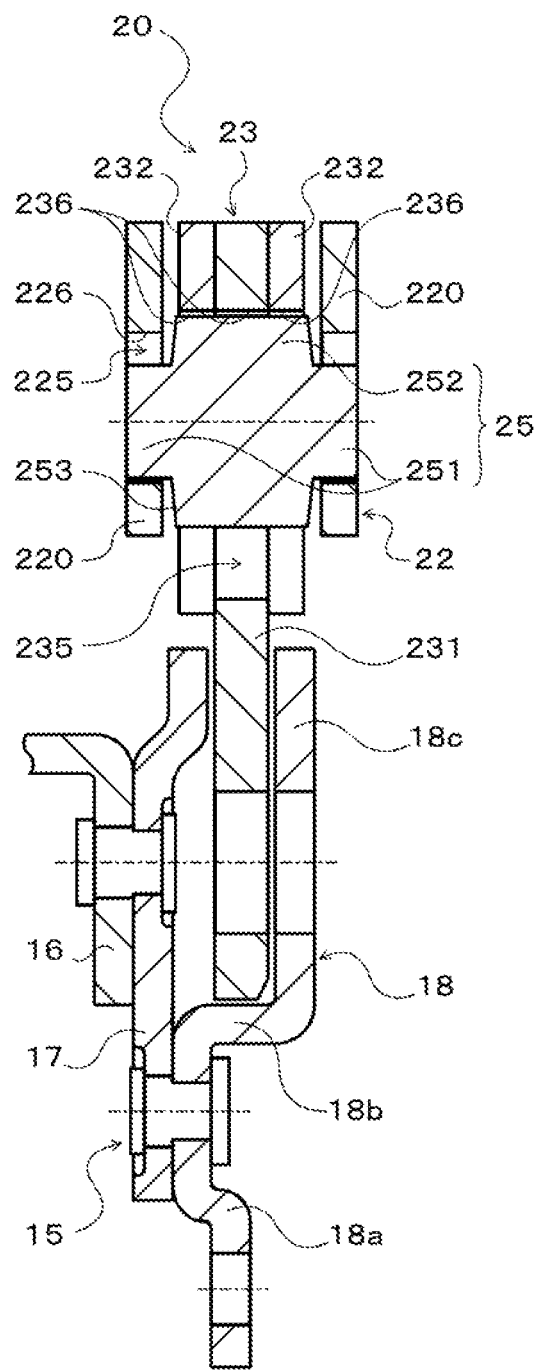
FIG. 5 is an enlarged sectional view illustrating the vibration damping apparatus disclosed herein.

As illustrated in FIG. 3 to FIG. 5, each weight body 22 has two plate members (masses) 220 having the same shape, and one coupling shaft 221. As illustrated in FIG. 3, each plate member 220 is formed of a metal plate so as to have a bilaterally symmetrical and arcuate planar shape. The two plate members 220 are coupled together via the one coupling shaft 221 so as to face each other at a distance in the axial direction of the second and third driven plates 17 and 18. As illustrated in FIG. 3, each plate member 220 has an outer peripheral surface and an inner peripheral surface defined by columnar surfaces.

Each plate member 220 has two first guide portions 225 arranged side by side at a distance in a width direction (circumferential direction). The two first guide portions 225 are formed in the plate member 220 symmetrically across a center line CL in the width direction of the plate member 220, which passes through the center of gravity of the weight body 22. Each first guide portion 225 is an opening extending in an arc shape. As illustrated in FIG. 3, the first guide portion 225 includes a first guide surface 226 that is a concave surface receding toward a rotation center RC of the second and third driven plates 17 and 18 (driven member 15) on an inner peripheral side of the plate member 220, and a convex first support surface 227 continuous with the first guide surface 226 and facing the first guide surface 226 on an outer peripheral side of the plate member 220.

The coupling shaft 221 is formed into a solid (or hollow) round bar shape. As illustrated in FIG. 3 and FIG. 4, the coupling shaft 221 is fixed (coupled) to the two plate members 220 so that its axis center passes through a center of gravity G of the weight body 22 on the center line CL (straight line passing through the rotation center RC of the second and third driven plates 17 and 18 in a state in which the weight body 22 is attached) in the width direction (circumferential direction) of the weight body 22 (plate member 220). The coupling shaft 221 has an outside diameter smaller than the distances between the pairs of inner surfaces 174 and 184 of the second and third driven plates 17 and 18 (widths of the slits 173 and 183) and the radial lengths of the inner surfaces 174 and 184. The coupling shaft 221 is slidably arranged in the slit 173 of each protrusion 172 of the second driven plate 17 so as to abut against one of the pair of inner surfaces 174, and is slidably arranged in the slit 183 of each protrusion 182 of the third driven plate 18 so as to abut against one of the pair of inner surfaces 184.

Thus, each weight body 22 is coupled to the second and third driven plates 17 and 18 serving as the support members so as to be movable in the radial direction relative to the second and third driven plates 17 and 18, and has a relationship of a sliding pair with the second and third driven plates 17 and 18. The coupling shaft 221 can abut against one of the inner surfaces 174 of the corresponding slit 173 and one of the inner surfaces 184 of the corresponding slit 183, thereby functioning as a torque transfer portion configured to transmit and receive a torque with the second and third driven plates 17 and 18. The coupling shaft 221 may rotatably support a cylindrical outer ring via a plurality of rollers or balls (rolling elements), or may rotatably support the outer ring without intervention of rolling elements.

The inertial mass 23 includes one annular first plate member 231 formed of a metal plate, and two annular second plate members 232 formed of metal plates. The weight of the inertial mass 23 (first and second plate members 231 and 232) is set sufficiently larger than the weight of one weight body 22. In this embodiment, the curvature radius of the outer peripheral surface of the first plate member 231 is set equal to the curvature radius of the outer peripheral surface of each second plate member 232. As illustrated in FIG. 4 and FIG. 5, the inner peripheral surface of each second plate member 232 is formed so as to be located on a radially outer side with respect to the inner peripheral surface of the first plate member 231 when the second plate member 232 is arranged coaxially with the first plate member 231. As illustrated in FIG. 4 and FIG. 5, the thickness of each second plate member 232 is set smaller than the thicknesses of the second and third driven plates 17 and 18 (protrusions 172 and 182).

As illustrated in FIG. 3 and FIG. 5, the first plate member 231 has a plurality of (for example, six in this embodiment) second guide portions 235 arranged such that every two second guide portions 235 are paired with each other and located side by side at a distance in the circumferential direction. In this embodiment, the two paired second guide portions 235 are formed in the first plate member 231 symmetrically across one of straight lines extending in the radial direction and trisecting the first plate member 231 about its center (straight lines equally dividing the first plate member 231 or the like into as many parts as the weight bodies 22). Each second guide portion 235 is an opening extending in an arc shape. As illustrated in FIG. 3, the second guide portion 235 includes a second guide surface 236 that is a concave surface receding opposite to the rotation center RC, that is, receding radially outward on an outer peripheral side of the first plate member 231, and a convex second support surface 237 continuous with the second guide surface 236 and facing the second guide surface 236 on an inner peripheral side of the first plate member 231. In this embodiment, as illustrated in FIG. 5, a plurality of second guide surfaces 236 are formed in the inner peripheral surface of each second plate member 232 at intervals in the circumferential direction so as to be continuous with the second guide surfaces 236 of the second guide portions 235 of the first plate member 231.

As illustrated in FIG. 3 and FIG. 5, the coupling member 25 has two first rolling portions (rollers) 251 and one second rolling portion (roller) 252 integrated into a round bar shape and extending coaxially with each other. In this embodiment, the outside diameter of the first rolling portion 251 is set smaller than the outside diameter of the second rolling portion 252, and the two first rolling portions 251 protrude axially outward from both ends of the second rolling portion 252. The rim of the outer peripheral surface of each first rolling portion 251 on the second rolling portion 252 side is spaced away in the axial direction from the rim of the outer peripheral surface of the second rolling portion 252 on the first rolling portion 251 side, and a conical tapered surface 253 is formed between the outer peripheral surface of each first rolling portion 251 and the outer peripheral surface of the second rolling portion 252. Each tapered surface 253 is inclined farther away from the small-diameter first rolling portion 251 and closer to the large-diameter second rolling portion 252 with increasing distance from the inner peripheral side to the outer peripheral side. The coupling member 25 may be solid as in the illustration, or may be hollow. The coupling member 25 may be obtained by fitting a bar or a pipe serving as the first rolling portions 251 to a pipe serving as the second rolling portion 252.

As illustrated in FIG. 4 and FIG. 5, the second and third driven plates 17 and 18 serving as the support members are arranged side by side in the axial direction between the two plate members 220 that structure the weight body 22. As described above, the second driven plate 17 and the annular portion 18c of the third driven plate 18 face each other at a distance in the axial direction, and the first plate member 231 of the inertial mass 23 is arranged therebetween in the axial direction. The inner peripheral surface of the first plate member 231 is rotatably supported by the outer peripheral surface of the cylindrical portion 18b of the third driven plate 18. Thus, the inertial mass 23 is aligned with the damper hub 7 by the driven member 15, and is therefore supported by the second and third driven plates 17 and 18 so as to be rotatable about the rotation center RC. Accordingly, the inertial mass 23 has a relationship of a revolute pair with the second and third driven plates 17 and 18. Each second plate member 232 of the inertial mass 23 is arranged between the two plate members 220 of the weight body 22 in the axial direction, and is fixed to the surface of the first plate member 231 via an unillustrated fastener so as to be located on a radially outer side of a corresponding one of the second and third driven plates 17 and 18 (protrusions 172 and 182).

As illustrated in FIG. 4 and FIG. 5, the two plate members 220 of the weight body 22 are coupled together by the coupling shaft 221 so as to sandwich the second and third driven plates 17 and 18 (protrusions 172 and 182) and the inertial mass 23 from both sides in the axial direction. As illustrated in FIG. 3 and FIG. 4, the first plate member 231 of the inertial mass 23 has an opening 239 extending in an arc shape, and the coupling shaft 221 of the weight body 22 is inserted into the opening 239. In this embodiment, the inner surface of the opening 239 is formed out of contact with the coupling shaft 221.

As can be understood from FIG. 3, the first guide portions 225 of the plate member 220 of each weight body 22 and the second guide portions 235 of the first plate member 231 of the inertial mass 23 are located between adjacent protrusions 172 and 182 of the second and third driven plates 17 and 18 in the circumferential direction. Each coupling member 25 is arranged in the corresponding first guide portion 225 of each plate member 220 and the corresponding second guide portion 235 of the first plate member 231. That is, each coupling member 25 is arranged between the first guide portion 225 of the corresponding weight body 22 and the second guide portion 235 of the inertial mass 23 so that each first rolling portion 251 rolls along the corresponding first guide surface 226 and the second rolling portion 252 rolls along the corresponding second guide surface 236. Thus, each weight body 22 and the inertial mass 23 are coupled together.

The first guide surface 226 of the first guide portion 225 of the weight body 22 and the second guide surface 236 of the second guide portion 235 of the inertial mass 23 are formed so that the first rolling portion 251 of the coupling member 25 rolls along the first guide surface 226 and the second rolling portion 252 of the coupling member 25 rolls along the second guide surface 236 along with the rotation of the second and third driven plates 17 and 18 to cause the center of gravity G of the weight body 22 to swing relative to (moves closer to or away from) the rotation center RC of the second and third driven plates 17 and 18 along the radial direction and to swing about an imaginary axis 24, which is defined to have an invariant position relative to the inertial mass 23, while keeping a constant axis-to-axis distance L1 to the imaginary axis 24. The imaginary axis 24 is a straight line orthogonal to the first plate member 231 or the like through a point located on one of the straight lines extending in the radial direction and trisecting the first plate member 231 or the like about its center (straight lines equally dividing the first plate member 231 or the like into as many parts as the weight bodies 22) and spaced away from the center of the first plate member 231 or the like (rotation center RC) by a predetermined axis-to-axis distance L2.

As described above, in the vibration damping apparatus 20, each weight body 22 has a relationship of a sliding pair with the second and third driven plates 17 and 18, and the second and third driven plates 17 and 18 have a relationship of a revolute pair with the inertial mass 23. Since the first rolling portion 251 of the coupling member 25 can roll along the first guide surface 226 and the second rolling portion 252 of the coupling member 25 can roll along the second guide surface 236, each weight body 22 has a relationship of a sliding pair with the inertial mass 23. Thus, the second and third driven plates 17 and 18, the plurality of weight bodies 22, the inertial mass 23, and the coupling members 25 structure a slider crank mechanism (double-slider crank chain). The equilibrium of the vibration damping apparatus 20 is a state in which the center of gravity G of each weight body 22 is located on a straight line passing through the corresponding imaginary axis 24 and the rotation center RC (see FIG. 3).

In this embodiment, the plate members 220 of each weight body 22 and the inertial mass 23 (first and second plate members 231 and 232) are arranged while being offset in the axial direction of the second and third driven plates 17 and 18 serving as the support members, and each of the second and third driven plates 17 and 18 is arranged between the plate member 220 of each weight body 22 and the inertial mass 23 in the axial direction. That is, the second driven plate 17 (protrusion 172) is arranged between one plate member 220 of each weight body 22 and the first plate member 231 of the inertial mass 23 in the axial direction, and the third driven plate 18 (protrusion 182) is arranged between the other plate member 220 of each weight body 22 and the first plate member 231 of the inertial mass 23 in the axial direction. Each weight body 22 and the inertial mass 23 (first and second plate members 231 and 232) at least partially overlap the first and second springs SP1 and SP2 of the damper apparatus 10 in the radial direction when viewed in the axial direction (from the turbine runner 5 side).

As illustrated in FIG. 4, each plate member 220 of the weight body 22 has at least one projection (dowel) 220$p$ that abuts against the surface of the protrusion 172 of the second driven plate 17 or the surface of the protrusion 182 of the third driven plate 18 to restrict axial movement of the plate member 220 relative to the second and third driven plates 17 and 18. As illustrated in FIG. 4, the second driven plate 17 has a plurality of projections (dowels) 17$p$ formed at intervals in the circumferential direction such that the projections 17$p$ abut against one surface of the first plate member 231 of the inertial mass 23 to restrict axial movement of the inertial mass 23. As illustrated in FIG. 4, the third driven plate 18 has a plurality of projections (dowels) 18$p$ formed at intervals in the circumferential direction such that the projections 18$p$ abut against the other surface of the first plate member 231 of the inertial mass 23 to restrict axial movement of the inertial mass 23. Each of the second and third driven plates 17 and 18 may have a projection formed in sliding contact with each plate member 220 of the weight body 22. The first plate member 231 of the inertial mass 23 may have a projection formed in sliding contact with the second or third driven plate 17 or 18.

Next, an operation of the starting apparatus 1 including the vibration damping apparatus 20 is described. As can be understood from FIG. 1, when the lock-up is not executed by the lock-up clutch 8 in the starting apparatus 1, a torque (power) from the engine EG serving as a prime mover is transferred to the input shaft IS of the transmission TM via a path including the front cover 3, the pump impeller 4, the turbine runner 5, and the damper hub 7. As can be understood from FIG. 1, when the lock-up is executed by the lock-up clutch 8, the torque (power) from the engine EG is transferred to the input shaft IS of the transmission TM via a path including the front cover 3, the lock-up clutch 8, the driving member 11, the first springs SP1, the intermediate member 12, the second springs SP2, the driven member 15, and the damper hub 7.

When the lock-up is executed by the lock-up clutch 8 and the driving member 11 coupled to the front cover 3 by the lock-up clutch 8 rotates along with rotation of the engine EG, the first and second springs SP1 and SP2 act in series via the intermediate member 12 between the driving member 11 and the driven member 15 until the torque transferred to the driving member 11 reaches the torque T1. Thus, the torque transferred from the engine EG to the front cover 3 is transferred to the input shaft IS of the transmission TM, and the first and second springs SP1 and SP2 of the damper apparatus 10 damp (absorb) a fluctuation of the torque from the engine EG. When the torque transferred to the driving member 11 is equal to or greater than the torque T1, the first springs SP1 of the damper apparatus 10 damp (absorb) the fluctuation of the torque from the engine EG until the torque reaches the torque T2.

In the starting apparatus 1, when the damper apparatus 10 coupled to the front cover 3 by the lock-up clutch 8 rotates together with the front cover 3 along with execution of the lock-up, the second and third driven plates 17 and 18 (driven member 15) of the damper apparatus 10 also rotate in the same direction as that of the front cover 3 about the axis center of the starting apparatus 1. When the second and third driven plates 17 and 18 rotate, the coupling shaft 221 of each weight body 22 abuts against one of the pair of inner surfaces 174 of the corresponding slit 173 and one of the pair of inner surfaces 184 of the corresponding slit 183 depending on the rotation direction of the second and third driven plates 17 and 18.

The first rolling portion 251 of each coupling member 25 is pushed against the first guide surface 226 of the corresponding first guide portion 225 of the corresponding weight body 22 by an action of a centrifugal force on the weight body 22. The second rolling portion 252 is pushed against the second guide surface 236 of the corresponding second guide portion 235 of the inertial mass 23 by being pressed by the corresponding weight body 22 via the first rolling portion 251. The second rolling portion 252 of each coupling member 25 receives a force generated by the moment of inertia (rotational resistance) of the inertial mass 23 to roll along the corresponding second guide surface 236 toward one circumferential end of the second guide portion 235. Along with this, the first rolling portion 251 of each coupling member 25 rolls along the corresponding first guide surface 226 toward the other circumferential end of the first guide portion 225.

Figure 6:
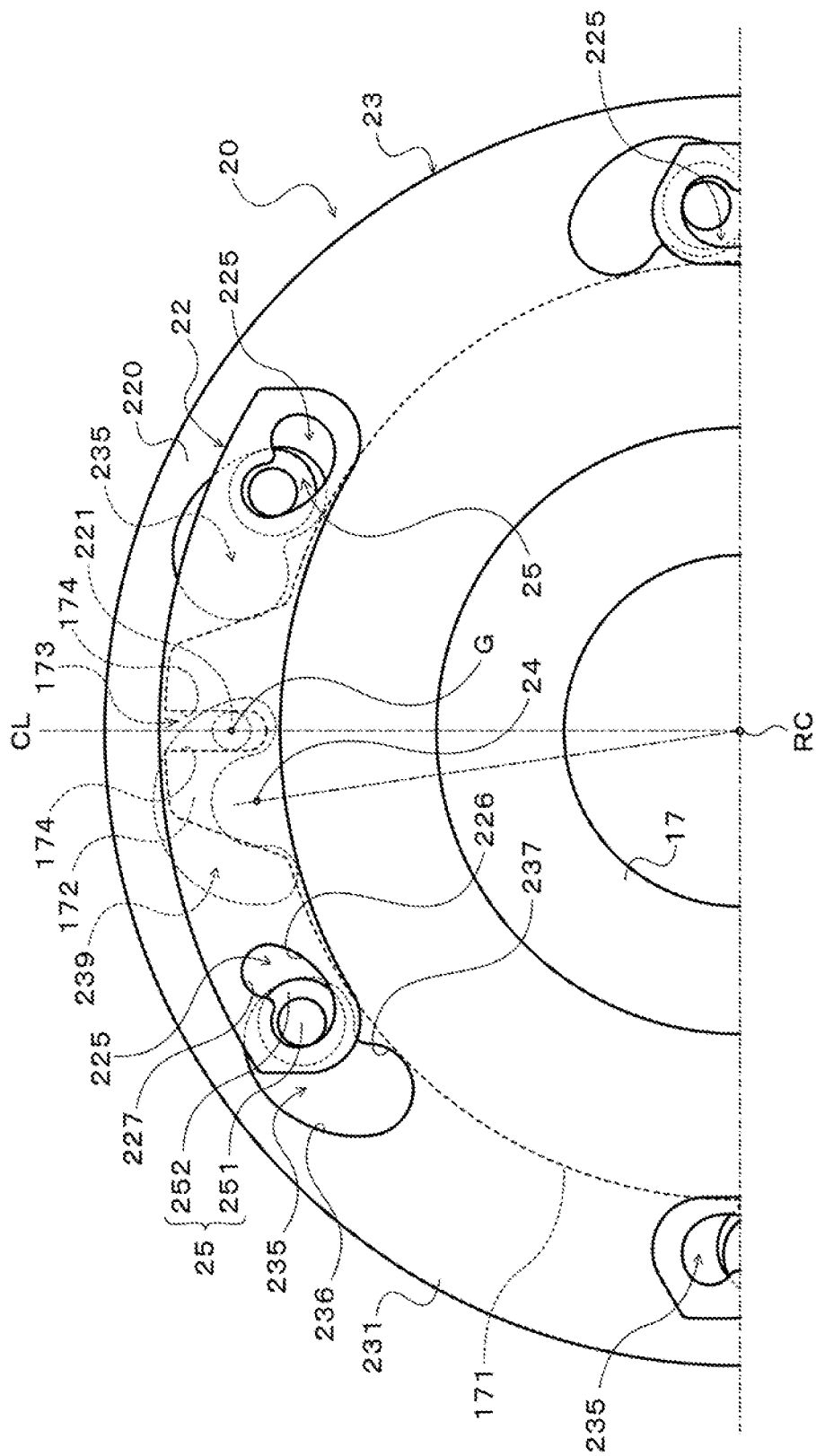
FIG. 6 is an enlarged view illustrating the vibration damping apparatus disclosed herein.

Thus, as illustrated in FIG. 6, when the second and third driven plates 17 and 18 rotate in one direction (for example, a clockwise direction in FIG. 6) about the rotation center RC, each weight body 22 (center of gravity G) is guided by two sets of the first and second guide surfaces 226 and 236 and the coupling members 25 to move closer to the rotation center RC along the radial direction of the second and third driven plates 17 and 18 while self-rotation is restricted. Since the first rolling portion 251 of each coupling member 25 rolls along the first guide surface 226 and the second rolling portion 252 of the coupling member 25 rolls along the second guide surface 236, the center of gravity G of each weight body 22 rotates about the imaginary axis 24 while keeping the constant axis-to-axis distance L1. Along with this, the inertial mass 23 rotates in an opposite direction about the rotation center RC relative to the second and third driven plates 17 and 18.

A component force of the centrifugal force acting on the center of gravity G of each weight body 22 is transferred to the inertial mass 23 via the first guide surface 226, the first and second rolling portions 251 and 252 of the coupling member 25, and the second guide surface 236 to serve as a restoration force for returning the inertial mass 23 to the equilibrium position. The restoration force overcomes a force (moment of inertia) for rotating the inertial mass 23 in the original rotation direction at the end of a swing range of the weight body 22, which is determined depending on the amplitude of vibration (vibration level) transferred from the engine EG to the second and third driven plates 17 and 18 (driven member 15). Thus, each weight body 22 is guided by the two sets of the first and second guide surfaces 226 and 236 and the coupling members 25 to move in an opposite direction away from the rotation center RC along the radial direction of the second and third driven plates 17 and 18 while self-rotation is restricted. The inertial mass 23 rotates in an opposite direction about the rotation center RC toward the equilibrium position in conjunction with each weight body 22 by an action of the restoration force from each weight body 22, that is, the component force of the centrifugal force.

When the inertial mass 23 reaches the equilibrium position in a state in which the second and third driven plates 17 and 18 rotate in the one direction, the inertial mass 23 may further rotate in the same direction due to a moment of inertia (stopping resistance). The second rolling portion 252 of each coupling member 25 receives a force generated by the moment of inertia (stopping resistance) of the inertial mass 23 to roll along the corresponding second guide surface 236 toward the other circumferential end of the second guide portion 235. Along with this, the first rolling portion 251 of each coupling member 25 rolls along the corresponding first guide surface 226 toward one circumferential end of the first guide portion 225. Thus, each weight body 22 (center of gravity G) is guided by the two sets of the first and second guide surfaces 226 and 236 and the coupling members 25 to move closer to the rotation center RC again along the radial direction of the second and third driven plates 17 and 18 while self-rotation is restricted. Since the first rolling portion 251 of each coupling member 25 rolls along the first guide surface 226 and the second rolling portion 252 of the coupling member 25 rolls along the second guide surface 236, the center of gravity G of each weight body 22 rotates about the imaginary axis 24 while keeping the constant axis-to-axis distance L1. Along with this, the inertial mass 23 rotates in the same direction about the rotation center RC relative to the second and third driven plates 17 and 18.

Also in this case, the component force of the centrifugal force acting on the center of gravity G of each weight body 22 is transferred as the restoration force to the inertial mass 23 via the first guide surface 226, the first and second rolling portions 251 and 252 of the coupling member 25, and the second guide surface 236, and overcomes the force (moment of inertia) for rotating the inertial mass 23 in the original rotation direction at the end of the swing range. Thus, each weight body 22 is guided by the two sets of the first and second guide surfaces 226 and 236 and the coupling members 25 to move away from the rotation center RC along the radial direction of the second and third driven plates 17 and 18 while self-rotation is restricted. The inertial mass 23 rotates about the rotation center RC toward the equilibrium position in conjunction with each weight body 22 by the action of the restoration force from each weight body 22, that is, the component force of the centrifugal force.

Thus, when the second and third driven plates 17 and 18 (driven member 15) rotate in one direction, each weight body 22 serving as the restoration force generating member of the vibration damping apparatus 20 swings (reciprocates) relative to the rotation center RC along the radial direction of the second and third driven plates 17 and 18 within the swing range including the equilibrium position at the center and determined depending on the amplitude of vibration (vibration level) transferred from the engine EG to the driven member 15. The component force of the centrifugal force acting on each weight body 22 is transferred as the restoration force to the inertial mass 23 via the first guide surface 226, the first and second rolling portions 251 and 252 of the coupling member 25, and the second guide surface 236, and the inertial mass 23 swings (reciprocally rotates) about the rotation center RC in a direction opposite to that of the vibration of the second and third driven plates 17 and 18 within a swing range including the equilibrium position at the center and determined depending on the swing range of each weight body 22.

Thus, a torque (inertial torque) having a phase opposite to that of a fluctuation torque (vibration) transferred from the engine EG to the driving member 11 can be applied from the swinging inertial mass 23 to the second and third driven plates 17 and 18 via the second guide surface 236, the coupling member 25, the first guide surface 226, and the protrusions 172 and 182. By setting specifications of the vibration damping apparatus 20 to provide an order depending on the order of vibration transferred from the engine EG to the second and third driven plates 17 and 18 (order of excitation: 1.5-th order when the engine EG is a three-cylinder engine, and second order when the engine EG is a four-cylinder engine), the vibration damping apparatus 20 can damp the vibration transferred from the engine EG to the driven member 15 (second and third driven plates 17 and 18) irrespective of the rotation speed of the engine EG (second and third driven plates 17 and 18). By coupling each weight body 22 and the inertial mass 23 by the coupling member 25 that rolls along the first and second guide surfaces 226 and 236, friction to be caused between the first guide surface 226 of the weight body 22 and the first rolling portion 251 of the coupling member 25 and between the second guide surface 236 of the inertial mass 23 and the second rolling portion 252 of the coupling member 25 is reduced as compared to a case where each weight body 22 is supported by the driven member 15 so as to be swingable in the radial direction. Thus, influence of the friction on the vibration damping performance can further be reduced. In addition, the degree of freedom in terms of a shape change is high in the coupling member 25 having the first and second rolling portions 251 and 252. Contact between the coupling member 25 and a surrounding member can easily be suppressed through appropriate setting of the shape of the coupling member 25, such as formation of the tapered surface 253 described above. As a result, the vibration damping performance of the vibration damping apparatus 20 can further be improved.

The first and second guide surfaces 226 and 236 are formed so that the first rolling portion 251 of the coupling member 25 rolls along the first guide surface 226 and the second rolling portion 252 of the coupling member 25 rolls along the second guide surface 236 along with the rotation of the second and third driven plates 17 and 18 (driven member 15) to cause each weight body 22 to swing relative to the rotation center RC along the radial direction of the second and third driven plates 17 and 18 and to swing about the imaginary axis 24 defined to have an invariant position relative to the inertial mass 23. Thus, the inertial mass 23 can swing about the rotation center RC in conjunction with each weight body 22 that swings relative to the rotation center RC along the radial direction of the second and third driven plates 17 and 18.

The first guide surface 226 is the concave surface receding toward the rotation center RC, and the second guide surface 236 is the concave surface receding opposite to the first guide surface 226, that is, receding radially outward. Thus, when the first rolling portion 251 of the coupling member 25 rolls along the first guide surface 226 and the second rolling portion 252 of the coupling member 25 rolls along the second guide surface 236, each weight body 22 can swing relative to the rotation center RC along the radial direction of the second and third driven plates 17 and 18, and the inertial mass 23 can swing about the rotation center RC. The first guide surface 226 may be a concave surface receding opposite to the rotation center RC, that is, receding radially outward, and the second guide surface 236 may be a concave surface receding opposite to the first guide surface 226, that is, receding toward the rotation center RC.

The coupling member 25 has the tapered surface 253 formed between the rim of the outer peripheral surface of the first rolling portion 251 on the second rolling portion 252 side and the rim of the outer peripheral surface of the second rolling portion 252 on the first rolling portion 251 side. The tapered surface 253 is inclined farther away from the small-diameter first rolling portion 251 and closer to the large-diameter second rolling portion 252 with increasing distance from the inner peripheral side to the outer peripheral side. Therefore, contact between the coupling member 25 and each plate member 220 adjacent to the coupling member 25 is suppressed as illustrated in FIG. 5. Thus, friction to be caused between the plate member 220 and the coupling member 25 can be reduced.

Each weight body 22 has the two first guide surfaces 226 arranged symmetrically across the center line CL in the width direction. The inertial mass 23 has the plurality of second guide surfaces 236 formed in association with the first guide surfaces 226 of each weight body 22. The two sets of the first and second guide surfaces 226 and 236 and the coupling members 25 restrict the self-rotation of the weight body 22. Thus, it is possible to suppress a decrease in the order of the vibration damping apparatus 20 due to the self-rotation of the weight body 22. Further, each weight body 22 smoothly swings relative to the second and third driven plates 17 and 18. Thus, it is possible to suppress attenuation of the centrifugal force (its component force) acting on each weight body 22 for use as the restoration force for causing the inertial mass 23 to swing. If each weight body 22 is coupled to the second and third driven plates 17 and 18 so as to transmit and receive a torque via the coupling shaft 221 and the pairs of inner surfaces 174 and 184 of the slits 173 and 183, the self-rotation of each weight body 22 can be restricted by the coupling shaft 221, the inner surfaces 174 and 184, and one set of the first and second guide surfaces 226 and 236 and the coupling member 25. Thus, one first guide surface 226, one second guide surface 236, and one coupling member 25 may be provided in one weight body 22.

Each weight body 22 has the coupling shaft 221 serving as the torque transfer portion arranged on the center line CL in the width direction of the plate member 220 and configured to transmit and receive a torque with the second and third driven plates 17 and 18. The second and third driven plates 17 and 18 have, as the torque transfer surfaces configured to transmit and receive a torque with the weight body 22, the pairs of inner surfaces 174 and 184 formed so as to extend in the radial direction and face each other at a distance in the circumferential direction of the second and third driven plates 17 and 18, respectively. The motion of the weight body 22 is defined (limited) by the two sets of the first and second guide surfaces 226 and 236 and the coupling members 25 arranged symmetrically across the center line CL. Thus, a friction force to be generated between the coupling shaft 221 on the center line CL and each of the protrusions 172 and 182 of the second and third driven plates 17 and 18 can be reduced when a torque is transmitted and received between the weight body 22 and each of the second and third driven plates 17 and 18. As a result, the vibration damping performance of the vibration damping apparatus 20 can further be improved.

The weight body 22 may have two coupling shafts 221 (torque transfer portions) arranged at a distance in the width direction (circumferential direction) of the weight body 22 (plate member 220), and a protrusion (second torque transfer portion) extending in the radial direction and arranged between the two coupling shafts 221 may be formed on each of the second and third driven plates 17 and 18 serving as the support members. Even if this structure is employed, each of the second and third driven plates 17 and 18 can be coupled to the weight body 22 so that a torque is transferred therebetween, and a friction force to be generated between their coupling portion, that is, the protrusion and the coupling shaft 221 can be reduced.

In the vibration damping apparatus 20, the plate members 220 of each weight body 22 and the inertial mass 23 are arranged while being offset in the axial direction of the second and third driven plates 17 and 18 serving as the support members, and each of the second and third driven plates 17 and 18 (protrusions 172 and 182) is arranged between the plate member 220 of each weight body 22 and the inertial mass 23 in the axial direction. Thus, when the driven member 15 serving as the rotational element rotates, each weight body 22 is not brought into sliding contact with the inertial mass 23, and a sliding resistance between each weight body 22 and the inertial mass 23 does not influence the vibration damping performance of the vibration damping apparatus 20. In the vibration damping apparatus 20, when the driven member 15 rotates, that is, when the second and third driven plates 17 and 18 rotate, each weight body 22 (projections 220$p$) is brought into sliding contact with the second and third driven plates 17 and 18, and the inertial mass 23 is brought into sliding contact with the second and third driven plates 17 and 18 (projections 17$p$ and 18$p$). Researches and analyses conducted by the inventors demonstrate that a sliding resistance between each weight body 22 and each of the second and third driven plates 17 and 18 and a sliding resistance between the inertial mass 23 and each of the second and third driven plates 17 and 18 do not significantly influence the vibration damping performance of the vibration damping apparatus 20 as compared to the sliding resistance between each weight body 22 and the inertial mass 23. Thus, the vibration damping performance of the vibration damping apparatus 20 can further be improved by arranging each of the second and third driven plates 17 and 18 between the plate member 220 of each weight body 22 and the inertial mass 23 in the axial direction.

In the vibration damping apparatus 20, each weight body 22 includes the two plate members 220 coupled together so as to face each other at a distance in the axial direction, and the second and third driven plates 17 and 18 are arranged side by side in the axial direction between the two plate members 220. The inertial mass 23 (first plate member 231) is arranged between the second and third driven plates 17 and 18 in the axial direction. Therefore, the weights of each weight body 22 and the inertial mass 23, that is, the centrifugal force acting on each weight body 22 and the moment of inertia of the inertial mass 23 are sufficiently secured without sliding contact between each weight body 22 and the inertial mass 23. Thus, the vibration damping performance can further be improved.

In the vibration damping apparatus 20, the inertial mass 23 includes the first plate member 231 arranged between the second and third driven plates 17 and 18 in the axial direction, and the two second plate members 232 each arranged between the two plate members 220 of each weight body 22 in the axial direction and fixed to the first plate member 231 so as to be located on the radially outer side of a corresponding one of the second and third driven plates 17 and 18. As illustrated in FIG. 4 and FIG. 5, the thicknesses of the second and third driven plates 17 and 18 (protrusions 172 and 182) are set larger than the thicknesses of the second plate members 232 of the inertial mass 23. Thus, an axial clearance between the plate member 220 of each weight body 22 and the second plate member 232 of the inertial mass 23 is larger than an axial clearance between the plate member 220 of each weight body 22 and the second or third driven plate 17 or 18 (protrusion 172 or 182).

Thus, the plate member 220 of each weight body 22 and the first plate member 231 of the inertial mass 23 can be spaced away from each other by each of the second and third driven plates 17 and 18 without sliding contact, and the plate member 220 of each weight body 22 and the second plate member 232 of the inertial mass 23 can sufficiently be spaced away from each other to restrict contact therebetween. In addition, the vibration damping performance can further be improved by sufficiently securing the weight, that is, the moment of inertia of the inertial mass 23. Depending on the axial length of the projection 220$p$ of each plate member 220, the thicknesses of the second and third driven plates 17 and 18 (protrusions 172 and 182) need not essentially be set larger than the thicknesses of the second plate members 232 of the inertial mass 23. That is, by sufficiently increasing the axial length of the projection 220$p$, the axial clearance between the plate member 220 and the second plate member 232 can be set larger than the axial clearance between the plate member 220 and the second or third driven plate 17 or 18 irrespective of the thicknesses of the second and third driven plates 17 and 18 and the second plate members 232.

In the embodiment described above, the outside diameter of the first rolling portion 251 of the coupling member 25 is set smaller than the outside diameter of the second rolling portion 252 of the coupling member 25, but the disclosure is not limited to this case. Depending on the structure of the vibration damping apparatus 20, the outside diameters of the first and second rolling portions 251 and 252 may be set equal to each other, or the outside diameter of the first rolling portion 251 may be set larger than the outside diameter of the second rolling portion 252.

Figure 7:
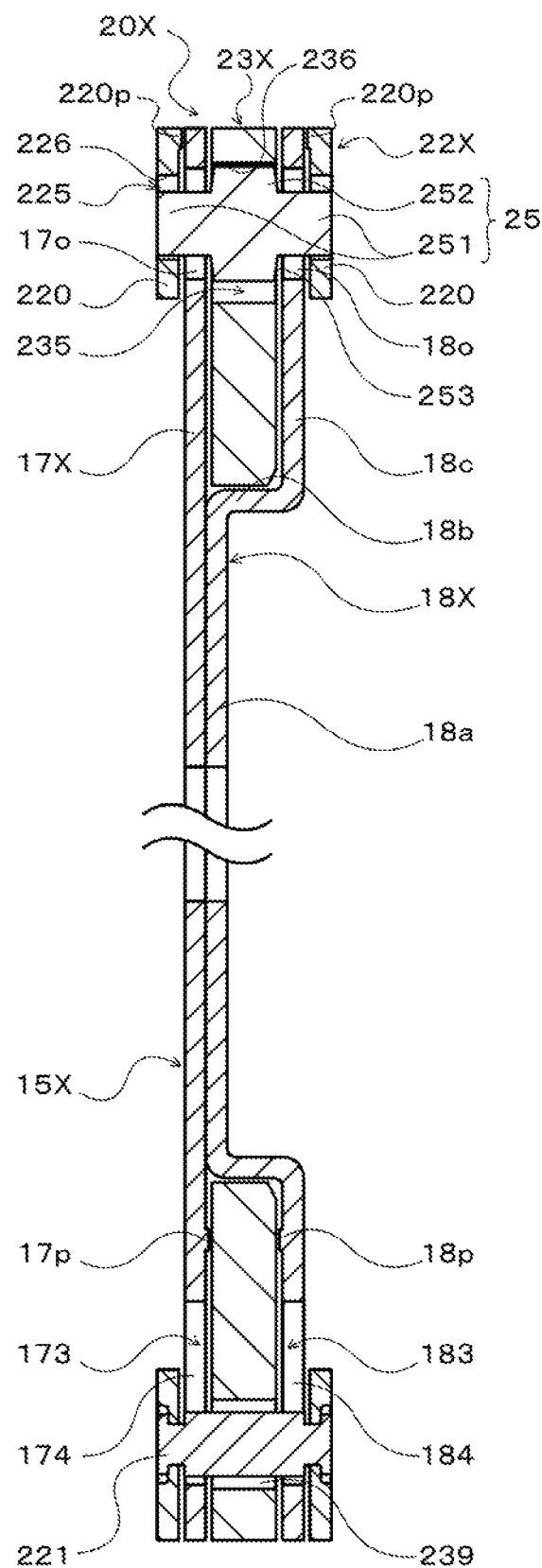
FIG. 7 is a sectional view illustrating another vibration damping apparatus disclosed herein.

FIG. 7 is a sectional view illustrating another vibration damping apparatus 20X disclosed herein. Components of the vibration damping apparatus 20X that are identical to those of the vibration damping apparatus 20 are represented by the same reference symbols to omit redundant description.

An inertial mass 23X of the vibration damping apparatus 20X illustrated in FIG. 7 corresponds to the inertial mass 23 from which the two second plate members 232 are omitted. That is, the inertial mass 23X is an annular member having the openings 239 and the plurality of second guide portions 235 (second guide surfaces 236) arranged such that every two second guide portions 235 are paired with each other and located side by side at a distance in the circumferential direction. Second and third driven plates 17X and 18X of a driven member 15X that structure the vibration damping apparatus 20X are annular members having substantially the same outside diameters as that of the inertial mass 23X. In the example of FIG. 7, the curvature radius of the outer peripheral surface of each of the second and third driven plates 17X and 18X is set equal to the curvature radius of the outer peripheral surface of the inertial mass 23X. The second driven plate 17X has a plurality of openings 17o formed on an outer peripheral portion at intervals in the circumferential direction so that each inner surface is kept out of contact with one first rolling portion 251 of the corresponding coupling member 25, and a plurality of slits 173 formed on the outer peripheral portion at intervals in the circumferential direction so as to extend in the radial direction of the second driven plate 17X. Similarly, the third driven plate 18X has a plurality of openings 18o formed on an outer peripheral portion at intervals in the circumferential direction so that each inner surface is kept out of contact with the other first rolling portion 251 of the corresponding coupling member 25, and a plurality of slits 183 formed on an outer peripheral portion of the annular portion 18c at intervals in the circumferential direction so as to extend in the radial direction of the third driven plate 18X.

Also in the vibration damping apparatus 20X, as illustrated in FIG. 7, the plate members 220 of each weight body 22X and the inertial mass 23X are arranged while being offset in the axial direction of the second and third driven plates 17X and 18X serving as the support members, and each of the second and third driven plates 17X and 18X is arranged between the plate member 220 of each weight body 22X and the inertial mass 23X in the axial direction. That is, the outer peripheral portion of the second driven plate 17X is arranged between one plate member 220 of each weight body 22X and the inertial mass 23X in the axial direction, and the annular portion 18c of the third driven plate 18X is arranged between the other plate member 220 of each weight body 22X and the inertial mass 23X in the axial direction. Also in the vibration damping apparatus 20X, actions and effects similar to those of the vibration damping apparatus 20 can be attained.

Figure 8:
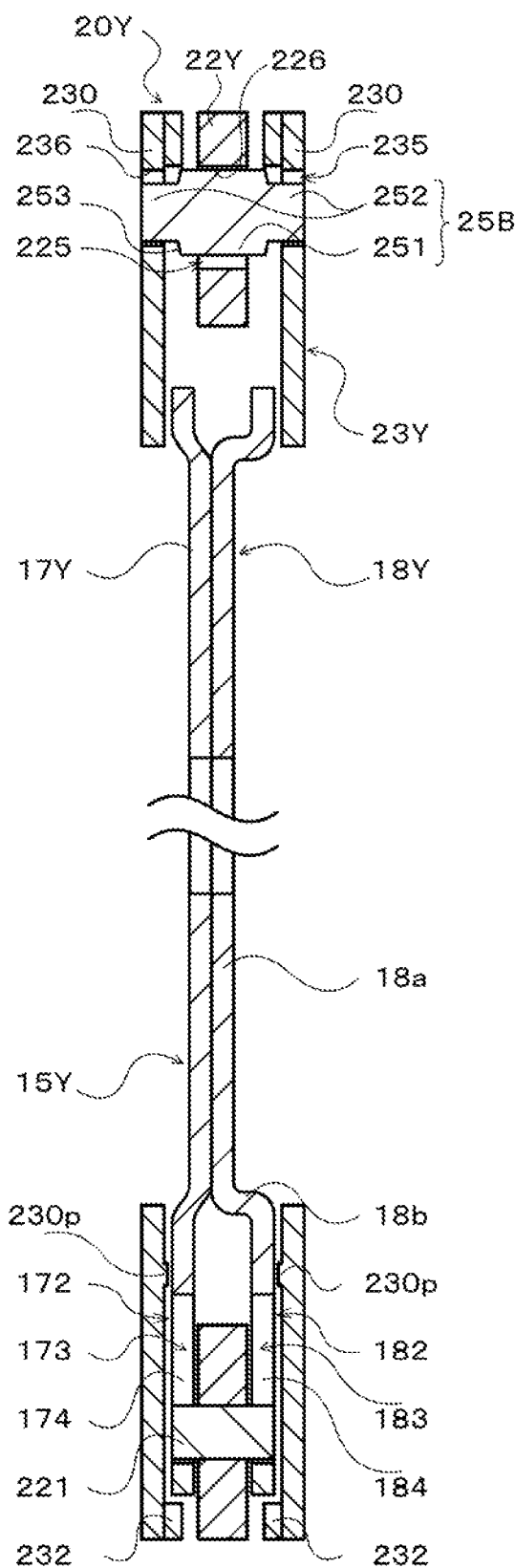
FIG. 8 is a sectional view illustrating still another vibration damping apparatus disclosed herein.

FIG. 8 is a sectional view illustrating still another vibration damping apparatus 20Y disclosed herein. Components of the vibration damping apparatus 20Y that are identical to those of the vibration damping apparatus 20 and the like are represented by the same reference symbols to omit redundant description.

A second driven plate 17Y of a driven member 15Y that structures the vibration damping apparatus 20Y illustrated in FIG. 8 has the plurality of protrusions 172 formed so as to protrude radially outward from its outer peripheral surface at intervals (at regular intervals) in the circumferential direction, and the slits 173 formed in the respective protrusions 172. Similarly, a third driven plate 18Y of the driven member 15Y has the plurality of protrusions 182 formed so as to protrude radially outward from its outer peripheral surface at intervals (at regular intervals) in the circumferential direction, and the slits 183 formed in the respective protrusions 182.

Each weight body 22Y of the vibration damping apparatus 20Y is a metal plate member having a bilaterally symmetrical and arcuate planar shape. The coupling shaft 221 is fixed to each weight body 22Y so as to protrude to both sides. The coupling shaft 221 is formed into a solid (or hollow) round bar shape. The axis center of the coupling shaft 221 passes through a center of gravity of the weight body 22Y, which is located on a center line in the width direction (circumferential direction) of the weight body 22Y. In the example of FIG. 8, the axial length of the coupling shaft 221 is set equal to or smaller than a distance between the outer surface of the protrusion 172 and the outer surface of the protrusion 182 of the second and third driven plates 17Y and 18Y fixed together. Each weight body 22Y has the two first guide portions 225 (first guide surfaces 226) arranged side by side at a distance in the width direction (circumferential direction). The two first guide portions 225 are formed in the plate member 220 symmetrically across a center line in the width direction of the plate member 220, which passes through the center of gravity of the weight body 22Y.

An inertial mass 23Y of the vibration damping apparatus 20Y includes two plate members 230 and the two second plate members 232 each fixed to a corresponding one of the two plate members 230. Each plate member 230 has the plurality of second guide portions 235 arranged such that every two second guide portions 235 are paired with each other and located side by side at a distance in the circumferential direction. The inner peripheral surface of each second plate member 232 is formed so as to be located on a radially outer side with respect to the inner peripheral surface of the plate member 230 when the second plate member 232 is arranged coaxially with the plate member 230. As illustrated in FIG. 8, the thickness of each second plate member 232 is set smaller than the thicknesses of the second and third driven plates 17Y and 18Y (protrusions 172 and 182).

As in the illustration, each coupling member 25B of the vibration damping apparatus 20Y has one first rolling portion 251 and two second rolling portions 252 integrated into a round bar shape and extending coaxially with each other. In the example of FIG. 8, the outside diameter of the second rolling portion 252 is set smaller than the outside diameter of the first rolling portion 251, and the two second rolling portions 252 protrude axially outward from both ends of the first rolling portion 251. The rim of the outer peripheral surface of each second rolling portion 252 on the first rolling portion 251 side is spaced away in the axial direction from the rim of the outer peripheral surface of the first rolling portion 251 on the second rolling portion 252 side, and the conical tapered surface 253 is formed between the outer peripheral surface of each second rolling portion 252 and the outer peripheral surface of the first rolling portion 251. Each tapered surface 253 is inclined farther away from the small-diameter second rolling portion 252 and closer to the large-diameter first rolling portion 251 with increasing distance from the inner peripheral side to the outer peripheral side. The coupling member 25B may be solid as in the illustration, or may be hollow. The coupling member 25B may be obtained by fitting a bar or a pipe serving as the second rolling portions 252 to a pipe serving as the first rolling portion 251.

As illustrated in FIG. 8, each weight body 22Y is arranged between the second and third driven plates 17Y and 18Y in the axial direction. One end of the coupling shaft 221 of each weight body 22Y is slidably arranged in the slit 173 of each protrusion 172 of the second driven plate 17Y so as to abut against one of the pair of inner surfaces 174. The other end of the coupling shaft 221 is slidably arranged in the slit 183 of each protrusion 182 of the third driven plate 18Y so as to abut against one of the pair of inner surfaces 184. The second and third driven plates 17Y and 18Y (protrusions 172 and 182) are arranged side by side in the axial direction between the two plate members 230 of the inertial mass 23Y. Each second plate member 232 of the inertial mass 23Y is fixed to the inner surface of the corresponding plate member 230 (surface on the weight body 22Y side) via an unillustrated fastener so as to be located on a radially outer side of a corresponding one of the second and third driven plates 17Y and 18Y (protrusions 172 and 182). As illustrated in FIG. 8, at least one projection 230p is formed on the inner surface of each plate member 230 of the inertial mass 23Y such that the projection 230p abuts against the surface of the protrusion 172 of the second driven plate 17Y or the surface of the protrusion 182 of the third driven plate 18Y to restrict axial movement of the plate member 230 relative to the second and third driven plates 17Y and 18Y. Each coupling member 25B is arranged in the corresponding first guide portion 225 of the weight body 22Y and the corresponding second guide portion 235 of the plate member 230. That is, each coupling member 25B is arranged between the first guide portion 225 of the corresponding weight body 22Y and the second guide portion 235 of the inertial mass 23Y so that the first rolling portion 251 rolls along the corresponding first guide surface 226 and the second rolling portion 252 rolls along the corresponding second guide surface 236. Thus, each weight body 22Y and the inertial mass 23Y are coupled together.

Also in the vibration damping apparatus 20Y, actions and effects similar to those of the vibration damping apparatus 20 can be attained. In the vibration damping apparatus 20Y, each weight body 22Y is arranged between the second and third driven plates 17Y and 18Y in the axial direction and between the two second plate members 232 of the inertial mass 23Y in the axial direction, and the thicknesses of the second and third driven plates 17Y and 18Y (protrusions 172 and 182) are set larger than the thicknesses of the second plate members 232. Thus, an axial clearance between each second plate member 232 of the inertial mass 23Y and each weight body 22Y is larger than an axial clearance between each plate member 230 of the inertial mass 23Y and the second or third driven plate 17Y or 18Y (protrusion 172 or 182).

Thus, each weight body 22Y and each plate member 230 of the inertial mass 23Y can be spaced away from each other by each of the second and third driven plates 17Y and 18Y without sliding contact, and each weight body 22Y and the second plate member 232 of the inertial mass 23Y can sufficiently be spaced away from each other to restrict contact there between. In addition, in the vibration damping apparatus 20Y, the vibration damping performance can further be improved by sufficiently securing the weight, that is, the moment of inertia of the inertial mass 23Y. Depending on the axial length of the projection 230p of each plate member 230, the thicknesses of the second and third driven plates 17Y and 18Y (protrusions 172 and 182) need not essentially be set larger than the thicknesses of the second plate members 232 of the inertial mass 23Y. That is, by sufficiently increasing the axial length of the projection 230p of each plate member 230, the axial clearance between the second plate member 232 and each weight body 22Y can be set larger than the axial clearance between the plate member 230 and the second or third driven plate 17Y or 18Y irrespective of the thicknesses of the second and third driven plates 17Y and 18Y and the second plate members 232.

In the vibration damping apparatus 20, 20X, or 20Y, the center of gravity G of each weight body 22, 22X, or 22Y swings about the imaginary axis 24 while keeping the constant axis-to-axis distance L1, but the disclosure is not limited to this case. That is, the vibration damping apparatus 20, 20X, or 20Y may be structured such that a portion other than the center of gravity of the weight body 22 swings about the imaginary axis 24 while keeping a constant axis-to-axis distance. Each of the support member, the weight body, and the inertial mass of the vibration damping apparatus 20, 20X, or 20Y may be formed of one plate member. In this case, each weight body and the inertial mass may be arranged while being offset in the axial direction of the support member, and the support member may be arranged between each weight body and the inertial mass in the axial direction.

Figure 9:
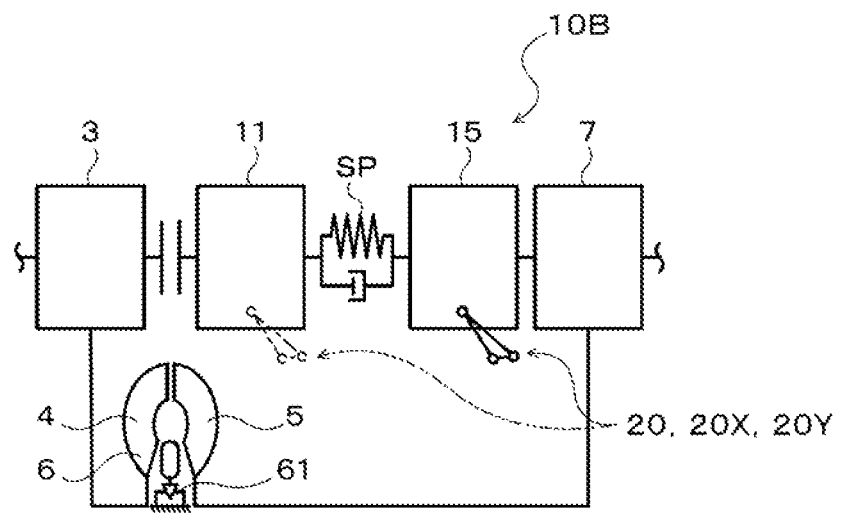
FIG. 9 is a schematic structural diagram illustrating a modification of a damper apparatus including the vibration damping apparatus disclosed herein.

The vibration damping apparatus 20, 20X, or 20Y may be coupled to the intermediate member 12 of the damper apparatus 10, or may be coupled to the driving member (input element) 11 (see long dashed double-short dashed lines in FIG. 1). The vibration damping apparatus 20, 20X, or 20Y may be applied to a damper apparatus 10B illustrated in FIG. 9. The damper apparatus 10B of FIG. 9 corresponds to the damper apparatus 10 from which the intermediate member 12 is omitted. The damper apparatus 10B includes the driving member (input element) 11 and the driven member 15 (output element) as the rotational elements, and includes, as the torque transfer elements, springs SP arranged between the driving member 11 and the driven member 15. In this case, the vibration damping apparatus 20, 20X, or 20Y may be coupled to the driven member 15 of the damper apparatus 10B as in the illustration, or may be coupled to the driving member 11 as indicated by long dashed double-short dashed lines in FIG. 9.

Figure 10:
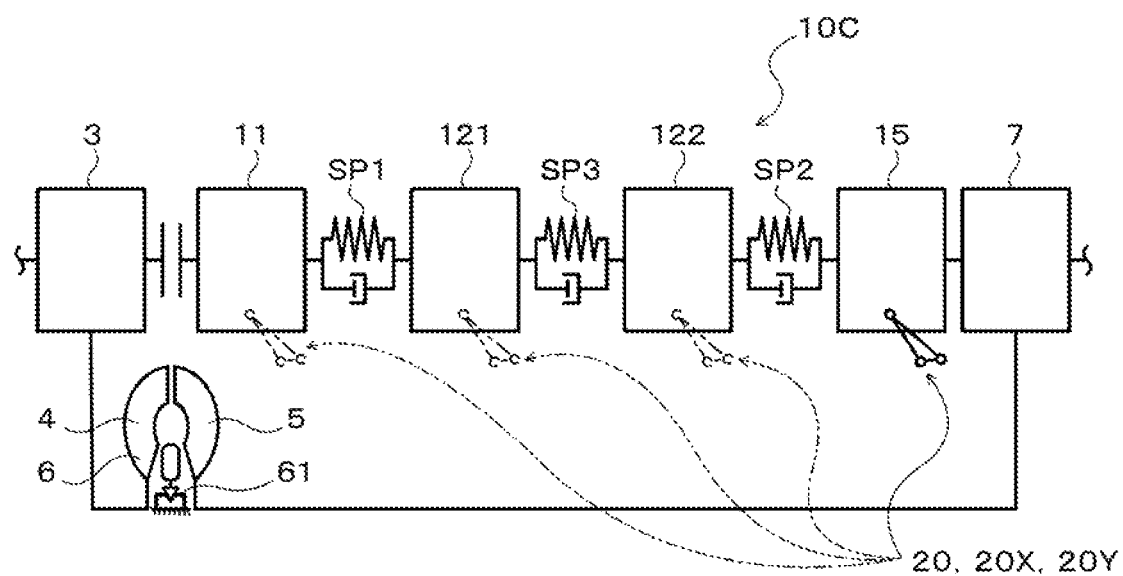
FIG. 10 is a schematic structural diagram illustrating another modification of the damper apparatus including the vibration damping apparatus disclosed herein.

The vibration damping apparatus 20, 20X, or 20Y may be applied to a damper apparatus 10C illustrated in FIG. 10. The damper apparatus 10C of FIG. 10 includes the driving member (input element) 11, a first intermediate member (first intermediate element) 121, a second intermediate member (second intermediate element) 122, and the driven member (output element) 15 as the rotational elements, and includes, as the torque transfer elements, the first springs SP1 arranged between the driving member 11 and the first intermediate member 121, the second springs SP2 arranged between the second intermediate member 122 and the driven member 15, and third springs SP3 arranged between the first intermediate member 121 and the second intermediate member 122. In this case, the vibration damping apparatus 20, 20X, or 20Y may be coupled to the driven member 15 of the damper apparatus 10C as in the illustration, or may be coupled to the first intermediate member 121, the second intermediate member 122, or the driving member 11 as indicated by long dashed double-short dashed lines in FIG. 10. In any case, the vibration can excellently be damped by both the damper apparatus 10, 10B, or 10C and the vibration damping apparatus 20, 20X, or 20Y by coupling the vibration damping apparatus 20, 20X, or 20Y to the rotational element of the damper apparatus 10, 10B, or 10C.

As described above, the vibration damping apparatus disclosed herein is the vibration damping apparatus (20, 20X, 20Y) including the support member (17, 17X, 17Y, 18, 18X, 18Y) configured to rotate together with the rotational element (11, 12, 121, 122, 15, 15X, 15Y), to which the torque is transferred from the engine (EG), about the rotation center (RC) of the rotational element (11, 12, 121, 122, 15, 15X, 15Y), the restoration force generating member (22, 22X, 22Y) coupled to the support member (17, 17X, 17Y, 18, 18X, 18Y) so as to transmit and receive the torque with the support member (17, 17X, 17Y, 18, 18X, 18Y) and configured to swing along with the rotation of the support member (17, 17X, 17Y, 18, 18X, 18Y), and the inertial mass coupled to the support member (17, 17X, 17Y, 18, 18X, 18Y) via the restoration force generating member (22, 22X, 22Y) and configured to swing about the rotation center (RC) in conjunction with the restoration force generating member (22, 22X, 22Y) along with the rotation of the support member (17, 17X, 17Y, 18, 18X, 18Y). The vibration damping apparatus (20, 20X, 20Y) includes the first guide surface (226) provided on the restoration force generating member (22, 22X, 22Y), the second guide surface (236) provided on the inertial mass (23, 23X, 23Y), and the coupling member (25, 25B) having the first rolling portion (251) and the second rolling portion (252) integrated together and arranged so that the first rolling portion (251) rolls along the first guide surface (226) and the second rolling portion (252) rolls along the second guide surface (236). The first and second guide surfaces (226, 236) are formed so that the first rolling portion (251) rolls along the first guide surface (226) and the second rolling portion (252) rolls along the second guide surface (236) along with the rotation of the support member (17, 17X, 17Y, 18, 18X, 18Y) to cause the restoration force generating member (22, 22X, 22Y) to swing relative to the rotation center (RC) along the radial direction of the support member (17, 17X, 17Y, 18, 18X, 18Y) and cause the inertial mass (23, 23X, 23Y) to swing about the rotation center (RC). When the support member (17, 17X, 17Y, 18, 18X, 18Y) rotates, the component force of the centrifugal force acting on the restoration force generating member (22, 22X, 22Y) is transferred from the first guide surface (226) to the second guide surface (236) via the coupling member (25, 25B).

In the vibration damping apparatus disclosed herein, when the support member rotates together with the rotational element, the restoration force generating member swings along the radial direction of the support member such that the first rolling portion of the coupling member rolls along the first guide surface of the restoration force generating member and the second rolling portion of the coupling member rolls along the second guide surface of the inertial mass. When the support member rotates together with the rotational element, the component force of the centrifugal force acting on the restoration force generating member is transferred to the inertial mass via the first guide surface, the coupling member, and the second guide surface, and the inertial mass swings about the rotation center in conjunction with the restoration force generating member such that the first rolling portion of the coupling member rolls along the first guide surface and the second rolling portion of the coupling member rolls along the second guide surface. Thus, the torque (inertial torque) having a phase opposite to that of the fluctuation torque transferred from the engine to the rotational element is applied to the support member via the restoration force generating member. Accordingly, the vibration of the rotational element can be damped. By coupling the restoration force generating member and the inertial mass by the coupling member that rolls along the first and second guide surfaces, friction to be caused between the restoration force generating member (first guide surface) and the coupling member (first rolling portion) and between the inertial mass (second guide surface) and the coupling member (second rolling portion) is reduced as compared to the case where the restoration force generating member is supported by the support member so as to be swingable in the radial direction. Thus, influence of the friction on the vibration damping performance can further be reduced. In addition, the degree of freedom in terms of a shape change is high in the coupling member having the first and second rolling portions. Contact between the coupling member and a surrounding member can easily be suppressed through appropriate setting of the shape of the coupling member. As a result, it is possible to further improve the vibration damping performance of the vibration damping apparatus including the restoration force generating member configured to swing in the radial direction of the support member along with the rotation of the support member and the inertial mass configured to swing in conjunction with the restoration force generating member.

The first and second guide surfaces (226, 236) may be formed so that the first rolling portion (251) rolls along the first guide surface (226) and the second rolling portion (252) rolls along the second guide surface (236) along with the rotation of the support member (17, 17X, 17Y, 18, 18X, 18Y) to cause the restoration force generating member (22, 22X, 22Y) to swing relative to the rotation center (RC) along the radial direction of the support member (17, 17X, 17Y, 18, 18X, 18Y) and to swing about the imaginary axis (24) defined to have an invariant position relative to the inertial mass (23, 23X, 23Y). Thus, the inertial mass can swing about the rotation center in conjunction with the restoration force generating member that swings relative to the rotation center along the radial direction of the support member.

The first guide surface (226) may be the concave surface receding toward the rotation center (RC) or receding opposite to the rotation center (RC). The second guide surface (236) may be the concave surface receding opposite to the first guide surface (226). Thus, when the first rolling portion rolls along the first guide surface and the second rolling portion rolls along the second guide surface, the restoration force generating member can swing relative to the rotation center along the radial direction of the support member, and the inertial mass can swing about the rotation center.

The first and second rolling portions (251, 252) may be integrated together so as to extend coaxially with each other. The diameter of one of the first and second rolling portions (251, 252) may be smaller than the diameter of the other one of the first and second rolling portions (251, 252).

The coupling member (25, 25B) may have the tapered surface (253) formed between the rim of the outer peripheral surface of the first rolling portion (251) on the second rolling portion (252) side and the rim of the outer peripheral surface of the second rolling portion (252) on the first rolling portion (251) side. The tapered surface (253) may be inclined farther away from the one of the first and second rolling portions (251, 252) and closer to the other one of the first and second rolling portions (251, 252) with increasing distance from the inner peripheral side to the outer peripheral side. Therefore, contact between the coupling member and a member adjacent to the coupling member is suppressed. Thus, friction to be caused between the member and the coupling member can be reduced.

The restoration force generating member (22, 22X, 22Y) may have two pieces of the first guide surface (226) arranged symmetrically across the center line (CL) in the width direction of the restoration force generating member (22, 22X, 22Y). The inertial mass (23, 23X, 23Y) may have a plurality of pieces of the second guide surface (236) formed in association with the pieces of the first guide surface (226) of the restoration force generating member (22, 22X, 22Y). Two sets of the first and second guide surfaces and the coupling members restrict the self-rotation of the restoration force generating member. Thus, it is possible to suppress a decrease in the order of the vibration damping apparatus due to the self-rotation of the restoration force generating member. Further, the restoration force generating member smoothly swings relative to the support member. Thus, it is possible to suppress attenuation of the centrifugal force (its component force) acting on the restoration force generating member for use as the restoration force for causing the inertial mass to swing.

The restoration force generating member (22, 22X, 22Y) may have the torque transfer portion (221) arranged on the center line (CL) and configured to transmit and receive the torque with the support member (17, 17X, 17Y, 18, 18X, 18Y). The motion of the restoration force generating member is defined (limited) by the two sets of the first and second guide surfaces and the coupling members arranged symmetrically across the center line. Thus, the friction force to be generated in the torque transfer portion on the center line can be reduced when the torque is transmitted and received between the restoration force generating member and the support member. As a result, the vibration damping performance of the vibration damping apparatus can further be improved.

The support member (17, 17X, 17Y, 18, 18X, 18Y) may be arranged between at least a part of the restoration force generating member (22, 22X, 22Y) and at least a part of the inertial mass (23, 23X, 23Y) in the axial direction. Therefore, the sliding resistance between the restoration force generating member and the inertial mass can be eliminated without sliding contact between the restoration force generating member and the inertial mass. Thus, the vibration damping performance of the vibration damping apparatus can further be improved.

One of the restoration force generating member (22, 22X, 22Y) and the inertial mass (23, 23X, 23Y) may include the two plate members (220, 230) coupled together so as to face each other at a distance in the axial direction. The support member may include the two support plates (17, 17X, 17Y, 18, 18X, 18Y) arranged side by side in the axial direction between the two plate members (220, 230). The restoration force generating member (22, 22X, 22Y) and the inertial mass (23, 23X, 23Y) may be arranged between the two support plates (17, 17X, 17Y, 18, 18X, 18Y) in the axial direction. Therefore, the weights of the restoration force generating member and the inertial mass are sufficiently secured without sliding contact between the restoration force generating member and the inertial mass. Thus, the vibration damping performance can further be improved.

The support member (17, 17X, 17Y, 18, 18X, 18Y) may be configured to rotate coaxially and together with any rotational element of the damper apparatus (10, 10B, 10C) including the plurality of rotational elements including at least the input element (11) and the output element (15, 15X, 15Y), and the elastic body (SP, SP1, SP2, SP3)) configured to transfer the torque between the input element (11) and the output element (15, 15X, 15Y). Thus, the vibration can excellently be damped by both the damper apparatus and the vibration damping apparatus by coupling the vibration damping apparatus to the rotational element of the damper apparatus.

The output element (15, 15X, 15Y) of the damper apparatus (10, 10B, 10C) may actively (directly or indirectly) be coupled to the input shaft (IS) of the transmission (TM).

It is understood that the various aspects of the disclosure is not limited to the embodiment described above and various modifications may be made within the extensive scope of the disclosure. The modes for carrying out these aspects are merely specific modes described in the "SUMMARY OF THE DISCLOSURE" section, and is not intended to limit the elements described in the "SUMMARY OF THE DISCLOSURE" section.

INDUSTRIAL APPLICABILITY

The aspects disclosed herein are applicable to, for example, the field of manufacture of a vibration damping apparatus configured to damp vibration of a rotational element.

The invention claimed is:

1. A vibration damping apparatus including a support member configured to rotate together with a rotational element, to which a torque is transferred from an engine, about a rotation center of the rotational element, a restoration force generating member coupled to the support member so as to transmit and receive the torque with the support member and configured to swing along with rotation of the support member, and an inertial mass coupled to the support member via the restoration force generating member and configured to swing about the rotation center in conjunction with the restoration force generating member along with the rotation of the support member, the vibration damping apparatus comprising:
   a first guide surface provided on the restoration force generating member;
   a second guide surface provided on the inertial mass; and
   a coupling member having a first rolling portion and a second rolling portion integrated together and arranged so that the first rolling portion rolls along the first guide surface and the second rolling portion rolls along the second guide surface, wherein
   the first and second guide surfaces are formed so that the first rolling portion rolls along the first guide surface and the second rolling portion rolls along the second guide surface along with the rotation of the support member to cause the restoration force generating member to swing relative to the rotation center along a radial direction of the support member and cause the inertial mass to swing about the rotation center, and
   when the support member rotates, a component force of a centrifugal force acting on the restoration force generating member is transferred from the first guide surface to the second guide surface via the coupling member,
   wherein the first and second guide surfaces are formed so that the first rolling portion rolls along the first guide surface and the second rolling portion rolls along the second guide surface along with the rotation of the support member to cause the restoration force generating member to swing relative to the rotation center along the radial direction of the support member and to swing about an imaginary axis defined to have an invariant position relative to the inertial mass.

2. The vibration damping apparatus according to claim 1, wherein the first guide surface is a concave surface receding toward the rotation center or receding opposite to the rotation center, and the second guide surface is a concave surface receding opposite to the first guide surface.

3. The vibration damping apparatus according to claim 1, wherein the first and second rolling portions are integrated together so as to extend coaxially with each other, and a diameter of one of the first and second rolling portions is smaller than a diameter of the other one of the first and second rolling portions.

4. The vibration damping apparatus according to claim 3, wherein the coupling member has a tapered surface formed between a rim of an outer peripheral surface of the first rolling portion on the second rolling portion side and a rim of an outer peripheral surface of the second rolling portion on the first rolling portion side, and the tapered surface is inclined farther away from the one of the first and second rolling portions and closer to the other one of the first and second rolling portions with increasing distance from an inner peripheral side to an outer peripheral side.

5. The vibration damping apparatus according to claim 1, wherein the restoration force generating member has two pieces of the first guide surface arranged symmetrically across a center line in a width direction of the restoration force generating member, and the inertial mass has a plurality of pieces of the second guide surface formed in association with the pieces of the first guide surface of the restoration force generating member.

6. The vibration damping apparatus according to claim 5, wherein the restoration force generating member has a torque transfer portion arranged on the center line and configured to transmit and receive the torque with the support member.

7. The vibration damping apparatus according to claim 1, wherein the support member is arranged between at least a part of the restoration force generating member and at least a part of the inertial mass in an axial direction.

8. The vibration damping apparatus according to claim 7, wherein one of the restoration force generating member and the inertial mass includes two plate members coupled together so as to face each other at a distance in the axial direction, the support member includes two support plates arranged side by side in the axial direction between the two plate members, and the other one of the restoration force generating member and the inertial mass is arranged between the two support plates in the axial direction.

9. The vibration damping apparatus according to claim 1, wherein the support member is configured to rotate coaxially and together with any rotational element of a damper apparatus including a plurality of rotational elements including at least an input element and an output element, and an elastic body configured to transfer the torque between the input element and the output element.

10. The vibration damping apparatus according to claim 9, wherein the output element of the damper apparatus is actively coupled to an input shaft of a transmission.

* * * * *